United States Patent
Lee et al.

(10) Patent No.: US 7,321,645 B2
(45) Date of Patent: Jan. 22, 2008

(54) METHOD AND ARRANGEMENT FOR DETECTING A RANDOM ACCESS CHANNEL PREAMBLE USING MULTIPLE ANTENNA RECEPTION IN A COMMUNICATION SYSTEM

(75) Inventors: Jung Ah Lee, Pittstown, NJ (US); Anil M. Rao, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 684 days.

(21) Appl. No.: 10/651,200

(22) Filed: Aug. 29, 2003

(65) Prior Publication Data

US 2005/0047530 A1    Mar. 3, 2005

(51) Int. Cl.
*H03D 1/00* (2006.01)
*H04L 27/06* (2006.01)

(52) U.S. Cl. ........... 375/343; 375/134; 375/136; 375/137; 375/142; 375/145; 375/147; 375/150

(58) Field of Classification Search ........ 375/136–137, 375/134, 142, 145, 147, 150, 343
See application file for complete search history.

(56) References Cited

U.S. PATENT DOCUMENTS

| | | | | |
|---|---|---|---|---|
| 5,724,270 | A * | 3/1998 | Posch | 702/77 |
| 6,141,373 | A * | 10/2000 | Scott | 375/150 |
| 7,031,290 | B2 * | 4/2006 | Ertel et al. | 370/342 |
| 7,076,015 | B2 * | 7/2006 | Bhatoolaul et al. | 375/365 |
| 2002/0067759 | A1 * | 6/2002 | Ertel et al. | 375/141 |
| 2002/0137548 | A1 * | 9/2002 | Miya | 455/562 |
| 2003/0058972 | A1 * | 3/2003 | Iochi | 375/343 |
| 2003/0086366 | A1 * | 5/2003 | Branlund et al. | 370/208 |
| 2004/0218569 | A1 * | 11/2004 | Pedersen et al. | 370/334 |

OTHER PUBLICATIONS

Proposal for RACH Preambles, TSG-R, WGI, TSGR1#6,(99)893, Jul. 1999.
3rd Generation Partnership Process; Technical Specification Group Radio Access Network; "Physical channels and mapping of transport channels onto physical channels(FDD) Release 5," 3GPP TS 25-211, V5.4.0., Jun. 2003.
3rd Generation Partnership Process; Technical Specification Group Radio Access Network; "Beamforming Enhancements", (Release 6); TR25.887, V1.2.0, 3GPP, Oct. 2002.
3rd Generation Partnership Process; Technical Specification Group Radio Access Network; "MAC Protocol Specification Release 5," 3GPP TS 25-321, V5.1.0, Jun. 2002.

* cited by examiner

Primary Examiner—Curtis Odom

(57) ABSTRACT

In a method and arrangement for detecting a random access channel preamble in a received uplink signal, the uplink signal is received at one or more receive antennas and contains data related to a random access channel preamble. The received uplink signal is subjected to spatial processing and temporal processing in order to detect the random access channel preamble. A best cell portion for communicating with a user may also be determined based on the detected preamble. The best cell portion represents a portion of a cell where a received uplink signal from a user has a highest signal to interference ratio. The detected random access channel preamble is indicative of the best cell portion for communicating with the user.

20 Claims, 17 Drawing Sheets

METHOD AND ARRANGEMENT FOR DETECTING A RANDOM ACCESS CHANNEL PREAMBLE USING MULTIPLE ANTENNA RECEPTION IN A COMMUNICATION SYSTEM

BACKGROUND OF THE INVENTION

1. Field of the Invention

The present invention relates to random access channel (RACH) preamble detection in a communication system.

2. Description of Related Art

Expanded efforts are underway to support the evolution of the Universal Mobile Telecommunications System (UMTS) standard, which describes a network infrastructure implementing a next generation Wideband Code Division Multiple Access (W-CDMA) air interface technology. A UMTS typically includes a radio access network, referred to as a UMTS terrestrial radio access network (UTRAN). The UTRAN may interface with a variety of separate core networks (CN). The core networks in turn may communicate with other external networks (ISDN/PSDN, etc.) to pass information to and from a plurality of wireless users, or user equipments (UEs), that are served by radio network controllers (RNCs) and base transceiver stations (BTSs, also referred to as Node Bs), within the UTRAN, for example.

Setting up a communication channel typically involves the UE transmitting a known sequence, such as a sequence containing a series of symbols, on an access channel that is monitored by a receiver at the Node-B. The Node-B receiver detects the known sequence and uses it for functions such as estimating the round-trip delay between the UE and Node-B.

In UMTS, a random access transmission procedure may be employed to enable multiple UEs to share the same physical resources in establishing communications with a Node-B of a given cell. The Random Access Channel (RACH) is a common uplink transport channel that carries one or more preamble sequences and one or more message parts. In order to establish a connection for communicating with a Node-B in a particular cell (and the RNC serving the Node-B), a UE transmits the RACH on the uplink over a Physical Random Access Channel (PRACH) in the physical layer. The RACH is thus mapped to the PRACH.

The random access transmission may be based on a Slotted ALOHA approach with fast acquisition indication. In Slotted ALOHA, a UE may initiate the random access transmission at the beginning of a number of well-defined time intervals, known as access slots. There are 15 access slots per two frames. The access slots may be spaced 5120 chips apart. Information on what access slots are available for random access transmission may be given by higher layers (e.g., OSI layers 3-7).

The structure of the random access transmission includes a RACH preamble transmission followed by message part transmission. Each RACH preamble transmission is 4096 chips long and typically consists of 256 repetitions of length 16 Walsh-Hadamard preamble sequence signatures (denoted as 's') that are carried on the PRACH, hence 16 preamble signatures. RACH preamble transmission(s) may be repeated with power ramping, e.g., increasing the preamble transmission power by a power ramping step size as signaled by the Node B, until the UE detects a downlink Acquisition Indicator Channel (AICH) transmitted by the Node-B. Accordingly, initial uplink synchronization in UMTS between the UE and Node-B may be achieved by detecting the RACH preamble. After successful reception of AICH, the UE may transmit a connection request within the message part of the PRACH. In response, the Node B sends a connection setup message through FACH in the Secondary Common Control Physical Channel (SCCPCH). This completes a transition from what is referred to as a UTRAN Idle Mode to a UTRAN Connected Mode (e.g., connection is established).

RACH preamble detection is done at the Node B receiver by correlating the received signal by a scrambling code and a signature sequence. Since a received preamble signal is delayed by the round-trip propagation time between the Node B and the UE, with respect to Node B transmit time, correlation is searched over a time range, or search window corresponding to the round-trip delay between the Node B and the UE. A preamble is detected and the signature sequence corresponding to a transmitted signature is found when the correlation energy exceeds a certain predefined threshold. Typically, the resolution of time search is coarse, i.e., at a half-chip resolution.

For preamble detection, a conventional receiver at a Node-B uses a single antenna, referred to as a 'V-1' antenna configuration, or two-diversity antennas, known as a 'DIV-2V' antenna configuration. Additionally, conventional preamble detection within the receiver at the Node-B may employ 4096-chip coherent integration to detect the preamble signature. A conventional preamble detector implementation is shown in 3GPP TSGR1 #6 (99) 893, entitled "Proposal for RACH Preambles." A segmented preamble detector structure using sub-correlations instead of 4096-chip coherent integration may also be employed when the Doppler spread of the received signal is high, as is described in co-pending and commonly assigned U.S. patent application Ser. No. 09/665,511, filed Sep. 19, 2000 by Lee et al. and entitled "Segmented Correlator Architecture For Signal Detection In Fading Channels," and as described in co-pending and commonly assigned U.S. patent application Ser. No. 09/664,646, filed Sep. 19, 2000 by Lee et al. and entitled "Segmented Correlator Architecture For Multiple Signal Detection and Identification In Fading Channels".

At the Node B receiver, delay between the Node-B and the UE may be estimated by detecting one of the 16 preamble signatures. An initial search window to detect one or more of the preamble signatures may correspond to a round-trip delay between the Node-B and UE. Resolution of this initial search window is coarse. Typically, resolution of the initial search window is performed at half-chip resolution.

One issue being addressed by the 3rd Generation Partnership Project (3GPP), a body which drafts technical specifications for the UMTS standard and other cellular technologies, includes devising a procedure for determining a "best cell portion" during the random access transmission procedure described above between a UE, Node-B and serving RNC, as the UE attempts to establish a connection with the Node-B. A "best cell portion" may be understood as the portion of a cell where a received uplink signal has the highest signal to interference ratio (SIR). Beamforming using multiple antennas at Node B receiver may improve radio performance. Moreover, employing beamforming at the Node-B may also aid in determination of best cell portion, a measurement which may be included as part of the eventual Release 6 standard for beamforming that is still in development, 3G TR 25.887, V1.3.0 (October 2002), entitled "Beamforming Enhancements (Release 6)".

Beamforming antennas represent an array of antennas used to form one or more beams within a cell having controlled beam directions. Beamforming modes may be defined as a flexible mode or a fixed mode. The flexible beamforming mode includes beamforming antennas where the uplink and downlink beams are formed by the application of weight vectors to the received and/or transmitted signals, in order to control the relative phase between the signals applied at the antenna elements. The weight vectors, and hence beam directions, are flexible. Beamforming with a grid of fixed beams (e.g., fixed mode) may be defined as beamforming antennas where the uplink and downlink beams are formed in such a way that the beam directions are fixed.

The best cell portion determination may be considered a beam-specific type of Node-B measurement. Beam specific Node-B measurements are intended for radio resource management (RRM) purposes such as admission control (AC), packet scheduling (PS), etc. During the random access transmission procedure, regardless of whether the beamforming mode is flexible mode or fixed mode, the RNC serving the Node-B should know in which beam direction a new UE is located. This information may be necessary to make a decision on whether the UE can get a call accepted. However, conventional algorithms for preamble detection in Node-B receivers having a 'V-1' or 'DIV-2V' antenna configurations, as described above, do not offer an approach to determining a best cell portion. Moreover, there is no methodology for detecting RACH preamble efficiently so as to establish uplink synchronization, or a connection, between a UE and a Node-B employing multi-antenna beamforming arrangements.

SUMMARY OF THE INVENTION

Exemplary embodiments of the present invention are directed to a method and arrangement for detecting a random access channel preamble in a received uplink signal. In the method, an uplink signal received at one or more receive antennas and containing data related to a random access channel preamble may be subjected to spatial processing and temporal processing in order to detect the random access channel preamble. A best cell portion for communicating with a user may also be determined based on the detected preamble. The best cell portion represents a portion of a cell where a received uplink signal from a user has a highest signal to interference ratio. The detected random access channel preamble is indicative of the best cell portion for communicating with the user.

BRIEF DESCRIPTION OF THE DRAWINGS

Exemplary embodiments of the present invention will become more fully understood from the detailed description given herein below and the accompanying drawings, wherein like elements are represented by like reference numerals, which are given by way of illustration only and thus do not limit the exemplary embodiments of the present invention and wherein.

DETAILED DESCRIPTION OF EXEMPLARY EMBODIMENTS

Although the following description of the present invention is based on the Universal Mobile Telecommunications System (UMTS) network infrastructure implementing a next generation Wideband Code Division Multiple Access (W-CDMA) air interface technology, it should be noted that the exemplary embodiments shown and described herein are meant to be illustrative only and not limiting in any way. As such, various modifications will be apparent to those skilled in the art.

Where used below, base transceiver station (BTS) and Node-B are synonymous and may describe equipment that provides data connectivity between a packet switched data network (PSDN) such as the Internet, and one or more mobile stations. Additionally where used below, the terms user, user equipment (UE), subscriber, mobile, mobile station and remote station are synonymous and describe a remote user of wireless resources in a wireless communication network.

In general, the exemplary embodiments of the present invention introduce a method and arrangement for RACH preamble detection. The method and arrangement may employ closely-spaced antenna arrays for RACH preamble detection. Preamble detection performance may be improved using spatial processing by employing closely-spaced antenna arrays. In addition, an estimate of angle-of-arrival (AOA) of the RACH preamble transmission from a UE accessing a network, which is important for "best cell portion" measurements to satisfy UMTS Release 6 requirements and time delay between transmission from the UE and reception by a Node-B can be obtained which is important to lock onto multipath signal components, The processing at a receiver required for RACH reception is often computationally expensive. Typically, incorporating spatial processing would further increase the complexity, linearly with the number of spatial branches. However, the exemplary embodiments of the present invention provide a low-complexity method and arrangement adapted for spatial processing and temporal processing, to enable efficient RACH preamble detection. The method and arrangement may be implemented using a direct implementation of spatial processing or an efficient Fast Fourier Transform (FFT) implementation for spatial processing, for example. The method and arrangement in accordance with the exemplary embodiments may be well-suited for receivers employing beamforming technology based on fixed-beamforming, or a mixture of wide and narrow beams, for example due to the inherent mapping between spatial frequency and the orthogonal fixed beam angles via the FFT.

Figure 1A:
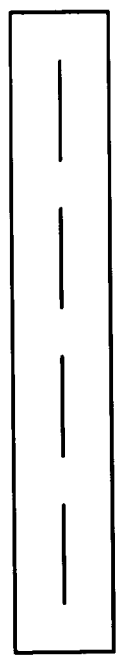
FIGS. 1A through 1D illustrate exemplary antenna configurations evaluated in accordance with exemplary embodiments of the present invention.
Figure 1B:
Figure 1C:
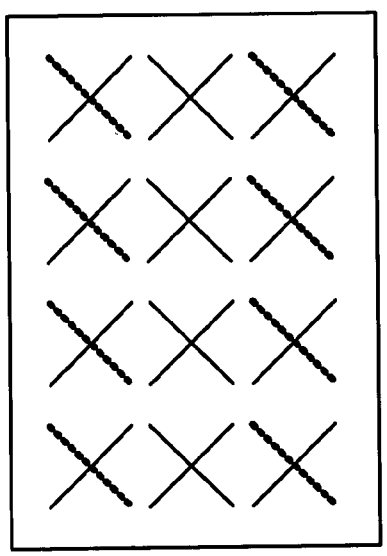
Figure 1D:
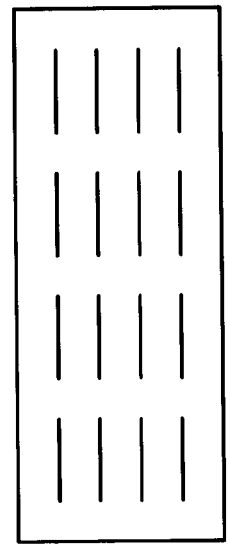

FIGS. 1A through 1D illustrate exemplary antenna configurations evaluated in accordance with exemplary embodiments of the present invention. FIG. 1A illustrates a V-1 antenna configuration, which may be embodied by a single antenna with vertical polarization. FIG. 1B illustrates a DIV-2 configuration composed of two widely spaced antennas. The spacing between antenna 'columns' is large as compared to the wavelength of a transmitted or received signal. FIG. 1C illustrates a clustered linear array (CLA-3X) antenna configuration. In a CLA-3X, spacing between antenna elements is a fraction of the wavelength of the transmitted/received signal, hence 'closely-spaced' antenna elements. FIG. 1D depicts a uniform linear array (ULA-4V) antenna configuration. A ULA-4V may be embodied as four (or more) closely spaced, parallel antenna elements.

For receivers employing multiple, closely-spaced antennas as described above, spatial processing may be introduced to improve RACH preamble detection performance. By using spatial processing, RACH preamble detection may be extended to spatial and temporal dimension(s). RACH preamble detection is performed to determine the existence or absence of a particular preamble signature in the RACH preamble transmission. In accordance with the exemplary embodiments, preamble detection may be achieved using hypothesis testing for all possible time delays of the transmitted preamble signature, and for all possible fixed beams. A temporal search region covers the total delay for an entire cell, where the total delay is the time between when the RACH preamble is transmitted by the UE and the time it is received at the Node-B. This may be done at coarse temporal resolution. A 'delay bin' corresponds to the time search resolution (typically, a half-chip resolution). Similarly, an 'angle bin' may be defined as a finite number of possible hypotheses in a spatial dimension.

Figure 2:
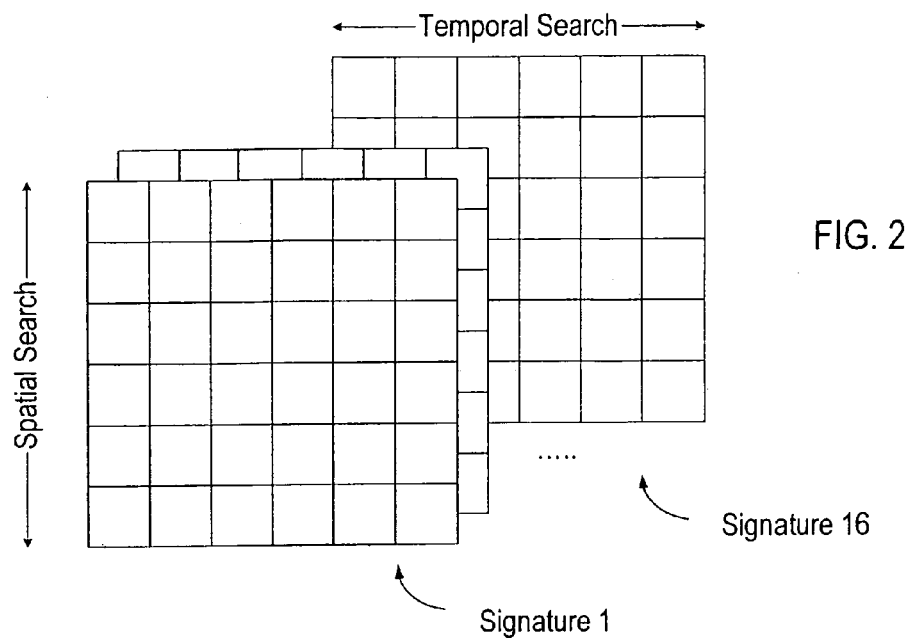
FIG. 2 illustrates an exemplary multi-dimensional uncertainty region in accordance with the exemplary embodiments of the present invention.

FIG. 2 illustrates an exemplary multi-dimensional uncertainty region for implementing the exemplary embodiments of the present invention. The uncertainty region may be divided into multiple bins in time and space. For a receiver with $N_\tau$ delay bins and $N_{AOA}$ angle bins, there are $N_\tau \cdot N_{AOA}$ total bins to search over for each of the 16 preamble signatures.

Figure 3:
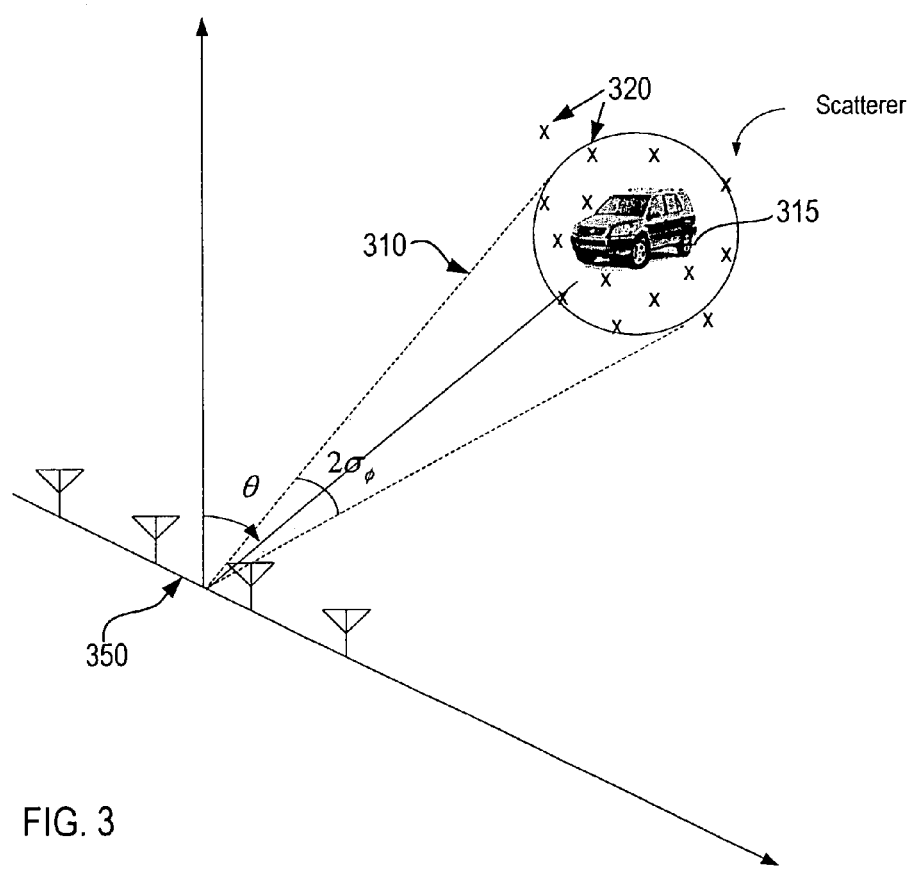
FIG. 3 is a geometrical model of an exemplary channel evaluated in accordance with the exemplary embodiments of the present invention.

FIG. 3 is a geometrical model of an exemplary channel evaluated in accordance with the exemplary embodiments of the present invention. FIG. 3 is provided to explain the spatial channel model used in simulation(s), and to clarify spatial channel parameters. In FIG. 3, signals 310 from a mobile station 315 experience random scattering before arriving at a base station receiver array 350. This random scattering may be modeled by a superposition of a large number of rays emanating from many uncorrelated scatterers 320 around the mobile station 315. In FIG. 3, nominal angle-of-arrival may be denoted by θ, and random angle deviation may be denoted by φ. While the spatial processing method is applicable to any spatial channel or angular spreading model, for performance evaluation we model the angle deviation φ as a Gaussian or uniformly distributed random variable with mean $\sigma_\phi^2$. Standard deviation $\sigma_\phi$ of the angle deviation is often called 'angle spread'.

Figure 4:
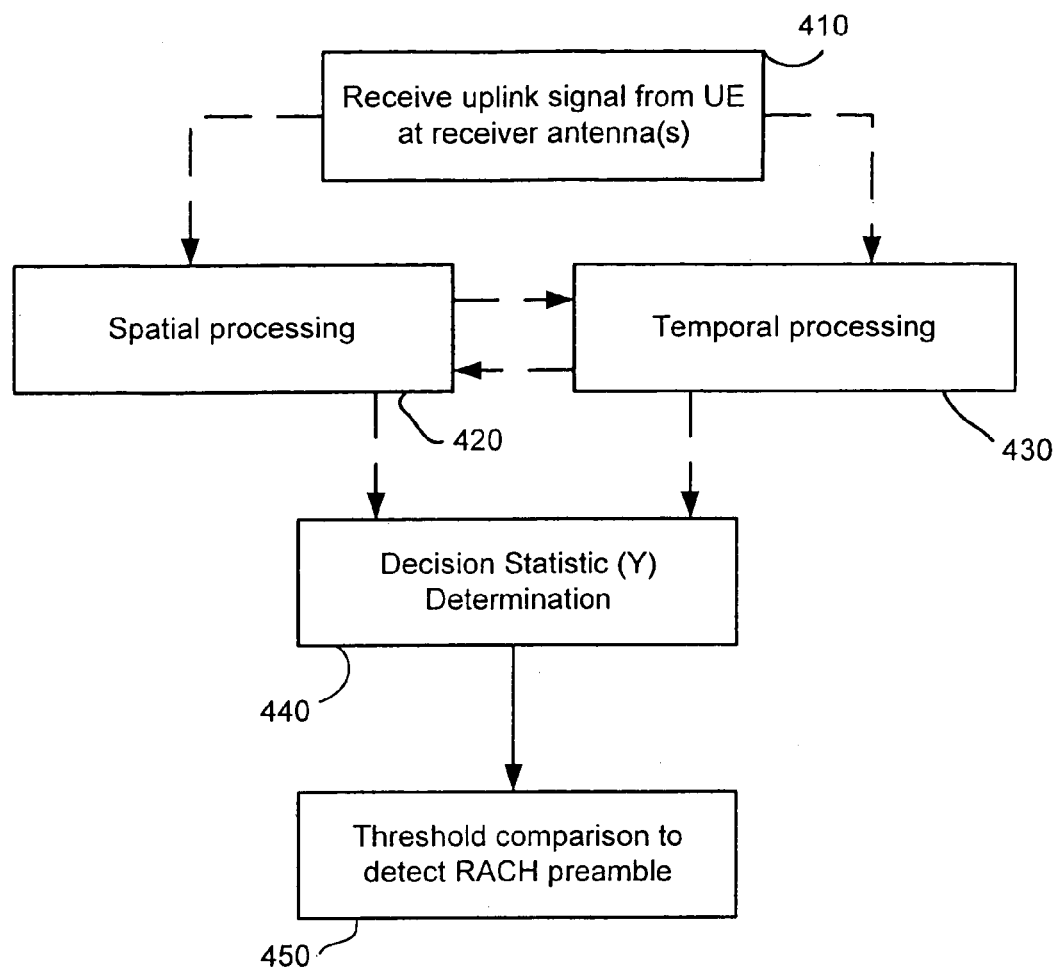
FIG. 4 is a flowchart describing a method of detecting a random access channel preamble in accordance with an exemplary embodiment of the invention.

FIG. 4 is a flowchart describing a method of detecting a random access channel preamble in accordance with an exemplary embodiment of the invention. Referring to FIG. 4, an uplink signal transmitted from a UE is received (function 410) by one or more closely-spaced receive antennas of a Node-B receiver. The uplink signal may contain data related to a random access channel preamble, and in particular to one or more (e.g., 16) preamble signature sequences. For example, the uplink signal may be embodied as a RACH preamble carried on the PRACH in the physical layer, which is transmitted on the uplink by the UE.

As will be described in further detail hereafter, the uplink signal may be subjected to both spatial processing (function 420) and temporal processing (function 430) in order to efficiently detect the RACH preamble. The particular order of processing is flexible: spatial processing may occur before temporal correlation, and vice versa, as shown by the dotted line arrows in FIG. 4. Spatial processing may be performed using a direct implementation for spatial processing in which all RACH users (e.g., UEs attempting to establish communication with a Node-B of a given cell) share a single 'spatial processing block' in the Node-B receiver architecture. Alternatively, spatial processing may be implemented with a Fast Fourier Transform (FFT) implementation to reduce computational complexity.

In either case, the output from spatial processing (if performed after temporal correlation) or the output from temporal processing (if performed after spatial processing) is used to determine a decision statistic (function 440), referred to generally as 'Y'. In general, and for each preamble signature in the uplink signal, a decision statistic Y is determined from a non-coherent sum of squared norms (e.g., sum of the squares of the real (I) and imaginary (Q) parts of a subcorrelation output, which is a result of the above processing). Spatial processing, temporal processing, and determination of the decision statistic will be discussed in detail below. The decision statistic having the maximum value is then compared (function 450) against a given threshold, referred to herein as "q". The given threshold q may be determined so that as the number of angle bins ($N_{AOA}$ angle bins) increase, the threshold increases. This maintains a probability of false alarm $P_{FA}$ over all angle bins at a desired value. $P_{FA}$ is the false alarm probability, a probability that a signal is falsely detected, when in fact no RACH preamble has been transmitted by the UE. The RACH preamble, and more particularly the preamble signature sequences in the RACH preamble transmission, are considered present (detected) if $Y \geq q$.

A best cell portion for communicating with a UE may also be determined based on the detected RACH preamble. As discussed above, the best cell portion represents a portion of a cell where a received uplink signal from a user has the highest signal to interference ratio. An accurate RACH preamble detection may indicate, to an RNC via the Node-B, a best cell portion for communicating with a new UE. For example, the RNC serving the Node-B may be able to decide whether the UE can get a call accepted based on the best cell portion determination

Spatial Processing-Direct Implementation

Considering the uplink signal of the RACH, a transmitted signal $S_k(t)$ for a user k may be modeled by equation (1):

$$S_k(t) = A_k c(t) d_k(t) \quad (1)$$

where $A_k$ is the transmitted signal amplitude of user k; $d_k(t)$ denotes a user-specific preamble signature sequence of user k, and c(t) is a cell-specific scrambling code. The received uplink signal $r_m(t)$ at a receiver antenna m of a Node-B receiver may be defined by equation (2):

$$r_m(t) = \sum_k \sum_l h_{kml} A_k c(t - \tau_{kml}) d_k(t - \tau_{kml}) + z_m(t). \quad (2)$$

In equation (2), $h_{kml}$ represents a channel coefficient of path l for receiver antenna m, $\tau_{kml}$ denotes a time delay of path l for user k, and $z_m(t)$ represents complex Gaussian noise that is spatially and temporally white, $z \sim CN(0, \sigma^2)$. Let r(t) represent the combined uplink signal received by the total number of receiver antennas M at the Node-B receiver, $r(t) = [r_0(t) r_0(t) \ldots r_{M-1}(t)]^T$, and let $w(\theta_p)$ be a weight vector in the direction of angle $\theta_p$, where p is an angle bin index, p=0, 1, ... P−1 (P denoting the number of beams, or angle bins). For a uniformly spaced linear antenna array, the weight vector may be expressed by equation (3):

$$w(\theta_p) = \frac{1}{\sqrt{M}} [1 \cdot e^{j\Delta \sin\theta_p} \ldots e^{j(M-1)\Delta\sin\theta_p}]^T \quad (3)$$

where $\Delta = 2\pi/\lambda$, d is the receive antenna spacing and $\lambda$ is the wavelength of the uplink signal. Disregarding additive noise terms, the signal after spatial processing by direct implementation, spatially processed signal $R(\theta_p)$, may be expressed by equation (4):

$$R(\theta_p) = w_p^H(\theta_p) \cdot r(t) \quad (4)$$

$$= \frac{1}{\sqrt{M}} \sum_k \sum_l \sum_{m=0}^{M-1} r_m(t) e^{-jm\Delta\sin\theta_p}$$

$$= \frac{1}{\sqrt{M}} \sum_k \sum_l \sum_{m=0}^{M-1} A_k h_{kml} e^{-jm\Delta\sin\theta_p} c(t - \tau_{kml}) \cdot d_k(t - \tau_{kml})$$

For a closely-spaced uniform linear antenna array, the channel coefficient $h_{kml}$ may be represented by equation (5), the terms of which may be substituted for $h_{kml}$ in equation (4) to determine a spatially processed signal $R(\theta_p)$ for a closely-spaced uniform linear antenna array:

$$h_{kl}(\theta) = \alpha_{kl} e^{j\phi_{kl}} [1 \cdot e^{j\Delta\sin\theta} \ldots e^{j(M-1)\Delta\sin\theta}]^T. \quad (5)$$

Spatial Processing using FFT

When the antenna spacing satisfies $d=\lambda/2$, $\Delta=\pi$. Accordingly, steering angles $\theta_p$ may be selected to satisfy the relation in equation (6):

$$\sin\theta_p = \frac{2p - M + 1}{M}, \quad p = 0, 1, \ldots, P-1. \quad (6)$$

The array vectors thus formed make the orthogonal spatial basis. Accordingly, the signal after spatial processing by FFT implementation, spatially processed signal $R(\theta_p)$ from equation (4), may now be expressed by equation (7):

$$R(\theta_p) = \frac{1}{\sqrt{M}} \sum_{m=0}^{M-1} r_m(t) e^{-jm\pi(\frac{2p-M+1}{M})} \quad (7)$$

$$= \frac{1}{\sqrt{M}} \sum_{m=0}^{M-1} r_m(t) e^{-j2\pi\frac{mp}{M}} e^{j\pi\frac{m(M-1)}{M}}$$

FFT implementation offers savings in computational complexity over direct implementation. Potential savings in complexity my be shown by comparing complex multiply-adds for implementing spatial processing. For M receive antennas and P angle bins (beams), complex multiply-adds required to implement spatial processing by direct implementation is M×P. The FFT implementation, which may be embodied as a radix-2 or radix-4 FFT algorithm with phase correction, for example, requires only M+(P/2×log$_2$M) complex multiply-adds. When M=P=4, FFT implementation requires 8 multiply-adds, as compared with 16 multiply-adds for direct implementation. This is a 50% savings in complexity. Since computational complexity for spatial processing may be inherently high, as spatial processing is computed for the incoming uplink signal (which is sampled at 2 times the chip-rate), this 50% saving in complexity may be significant. For a CLA-3X antenna configuration, a radix-3 FFT or other fast FFT algorithm my be used.

Temporal Processing: Temporal Correlation and Decision Statistic Calculation

Temporal processing may follow spatial processing. Temporal processing may include temporal correlation, calculation of a decision statistic, and threshold testing for RACH preamble detection. A correlator may be used to uncover the scrambling code (denoted as c(n) in FIGS. 5-8), and the RACH preamble signature sequence. Since there are 16 signatures (n=0 . . . 16), 16 correlators are needed to compute signature correlation for each scrambling code. Temporal correlation may be implemented with an efficient correlator that comprises a scrambling code correlator followed by fast-Hadamard Transform (FHT), such as is described in co-pending and commonly assigned U.S. patent application Ser. No. 09/773,176 to Lee et al., filed Sep. 19, 2000 and entitled "Segmented Architecture for Multiple Sequence Detection and Identification with Frequency Offset Compensation", the relevant portions of which are incorporated by reference herein. The structure of an exemplary correlator for 1024-chip coherent accumulation is shown as a subcorrelator and described in further detail in FIG. 9.

Multiple subcorrelators may be used to compute coherent accumulation, followed by a noncoherent sum of subcorrelation signals, represented hereafter for angle bin index p and subcorrelator index j as '$S_p^j$'. Noncoherent summing, or 'post-detection integration' may prevent the adverse effects of signal deccorelation in a fading channel. A subcorrelator structure offers flexibility in adjusting coherent accumulation lengths, depending on channel environments.

In general, a noncoherent sum of squared real (I) and imaginary (Q) parts of the subcorrelator outputs (represented by subcorrelator index j (j=0, 1 . . . J−1)) are used to compute the decision statistic. First the squares are computed, and then the squares are subject to noncoherent combining to obtain a decision statistic. The following equation (8) represents a general notation describing how a decision statistic Y, at a given time delay τ and angle-of-arrival θ, may be computed for each correlated RACH preamble signature sequence:

$$Y(\tau, \theta) = \sum_{j=0}^{J-1} (I_j^2 + Q_j^2) \qquad (8)$$

Let $S_p^j$ denote the signal at the output of subcorrelator j for angle $\theta_p$. Additionally, let the m-th antenna element of the weight vector $w(\theta_p)$ be denoted as $\omega_m = \omega_{mI} + j\omega_{mQ}$. Accordingly, a subcorrelation output signal may be expressed by equation (9):

$$S_p^j = \sum_{m=0}^{M-1} \omega_m \left[ \sum_{n=0}^{N_c-1} h_m |d(k)|^2 \sqrt{E_c} + \sum_{n=0}^{N_c-1} d(k)z(k) \right]. \qquad (9)$$

In equation (9), n is a chip, $N_c$ is the coherent accumulation length in number of chips for control bit block i, $h_m$ represents the channel coefficient for antenna element m, $E_c$ denotes the transmitted chip energy, z(n) denotes complex Gaussian noise of the chip-rate signal, and $|d(n)|^2$ is a constant. For a perfectly correlated channel, $h_m = e^{j\Delta \sin \theta}$. When $\theta = \theta_p$, $$\sum_{m=0}^{M-1} \omega_m h_m = M.$$

Furthermore, $|d(k)|^2 = 1$.

$$\text{Let } \tilde{z} = \sum_{n=0}^{N_c-1} d(n)z(n),$$

where $\tilde{z} \sim CN(0, \sigma^2)$. Thus, equation (9) may be rewritten as:

$$S_p^j = N_c \sqrt{ME_c} + \sum_{m=0}^{M-1} \omega_m \tilde{z} \qquad (10)$$

$$= N_c \sqrt{ME_c} + \sum_{m=0}^{M-1} (\omega_{mI}\tilde{z}_I + \omega_{mQ}\tilde{z}_Q) + j\sum_{m=0}^{M-1} (\omega_{mI}\tilde{z}_Q - \omega_{mQ}\tilde{z}_I)$$

The decision statistic, taking the magnitude squares of the subcorrelator output signal, may thus be expressed by equation (11):

$$Y_p^j = |S_p^j|^2 \qquad (11)$$

$$= \left| N_c \sqrt{ME_c} + \sum_{m=0}^{M-1} (\omega_{mI}\tilde{z}_I + \omega_{mQ}\tilde{z}_Q) \right|^2 + \left| \sum_{m=0}^{M-1} (\omega_{mI}\tilde{z}_Q - \omega_{mQ}\tilde{z}_I) \right|^2$$

A decision statistic having the maximum value $Y_{MAX}$ is selected and compared against a given threshold, q. The given threshold q may be determined so that as the number of angle bins increase, the threshold increases, so as to maintain a probability of false alarm $P_{FA}$ over all angle bins at a desired value. Equation (12) illustrates this comparison:

$Y_{MAX}$=arg max $|S_p^j|^2$;compare to threshold q
$Y_{MAX} \geq$ q, preamble present (detection),else no
preamble. (12)

Figure 5:
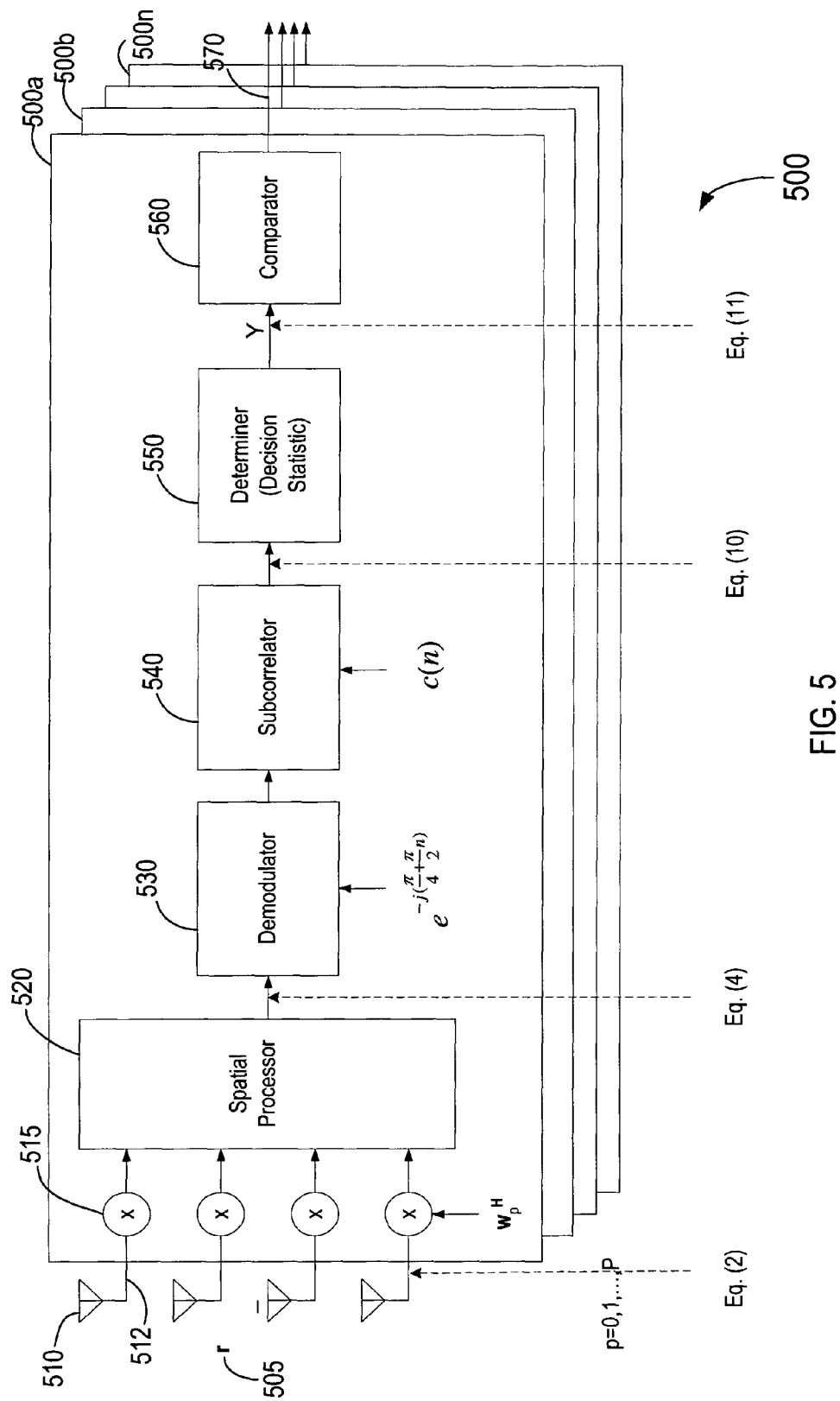
FIG. 5 is a block diagram of an arrangement for preamble detection with direct implementation of a spatial processing block, in accordance with an exemplary embodiment of the present invention.

FIG. 5 is a block diagram of an arrangement for preamble detection with direct implementation of a spatial processing block, in accordance with an exemplary embodiment of the present invention. FIG. 5 implements spatial processing at a level of a chip-rate signal by direct implementation, where a single spatial processing block is shared by all RACH users, e.g., spatial processing is performed for chip-rate signal and done once for all users. The block diagram described in FIG. 5 may be referred to as a 'chip-rate spatial processing option'.

FIG. 5 shows an arrangement 500 in which an uplink signal r (505) is received by a plurality of receive antennas 510 at different angles of arrival (not shown). The repeating blocks 500a, 500b, etc., represent duplication, with a different weight vector corresponding to the multiple beams (angle bins p) being used. The uplink signal on each branch 512 may be represented by equation (2). On each branch 512, each beam (angle bin p) of signal 505, arriving at a given $\theta_p$ is multiplexed by weight vector $w_p^H$, and the weighted signals are output to spatial processing block 520. The repeating blocks 500a, 500b, etc., represent duplication, with a different weight vector $w_p$ corresponding to each multiple beam (angle bin p) being used. Spatial processing block 520 computes a spatially processed signal $R(\theta_p)$ according to equation (4) above. Demodulator block 530 $R(\theta_p)$ demodulates the spatially processed signal $R(\theta_p)$ using a known demodulation sequence from the 3GPP Standard 3GPP TS 25.213 V5.1. The symbol j is the imaginary part of a complex number (j=square root of −1) and n denotes sequence index.

The demodulated signal undergoes temporal processing at subcorrelator block 540. The subcorrelator block 540 uncovers the scrambling code c(n) and the RACH preamble signature sequence using a scrambling code correlator followed by fast-Hadamard Transform (FHT). The output of subcorrelator block 540 is the subcorrelation output signal equation (10). The subcorrelation output signal is input to determiner block 550 for calculation of the decision statistic (equation 11). A maximum value decision statistic $Y_{MAX}$ is then input to a comparator block 560 for comparison to threshold q and hence RACH preamble detection. As discussed above, a RACH preamble 570 is present (detected) in the received uplink signal if comparator block 560 $Y_{MAX} \geq$ q.

Figure 6:
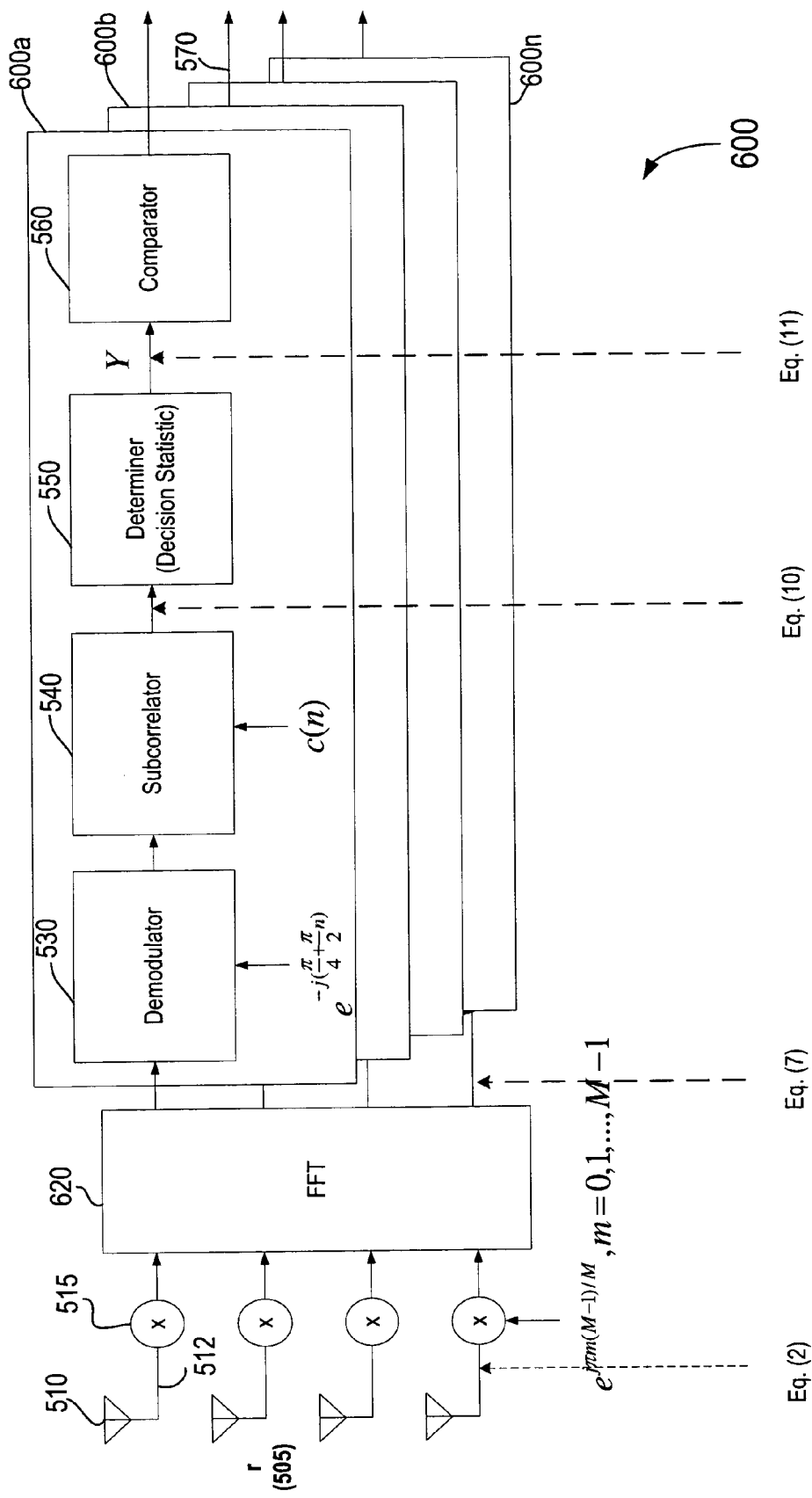
FIG. 6 is a block diagram of an arrangement for preamble detection with a FFT implementation of a spatial processing block, in accordance with an exemplary embodiment of the present invention.

FIG. 6 is a block diagram of an arrangement for preamble detection with a FFT implementation of a spatial processing block, in accordance with an exemplary embodiment of the present invention. FIG. 6 is similar to FIG. 5 in that it implements spatial processing at the level of a chip-rate signal so that a single spatial processing block is shared by all RACH users. FIG. 6 employs efficient FFT implementation instead of direct implementation, thus, only the differences from FIG. 5 are discussed. The repeating blocks 500a, 500b, etc., represent duplication, with a different weight vector corresponding to the multiple beams (angle bins p) being used. The weight vector multiplexed at multiplexer 515 for spatial processing in FFT block 620 is represented by the second exponential term of equation (7) for FFT implementation of spatial processing.

Figure 7:
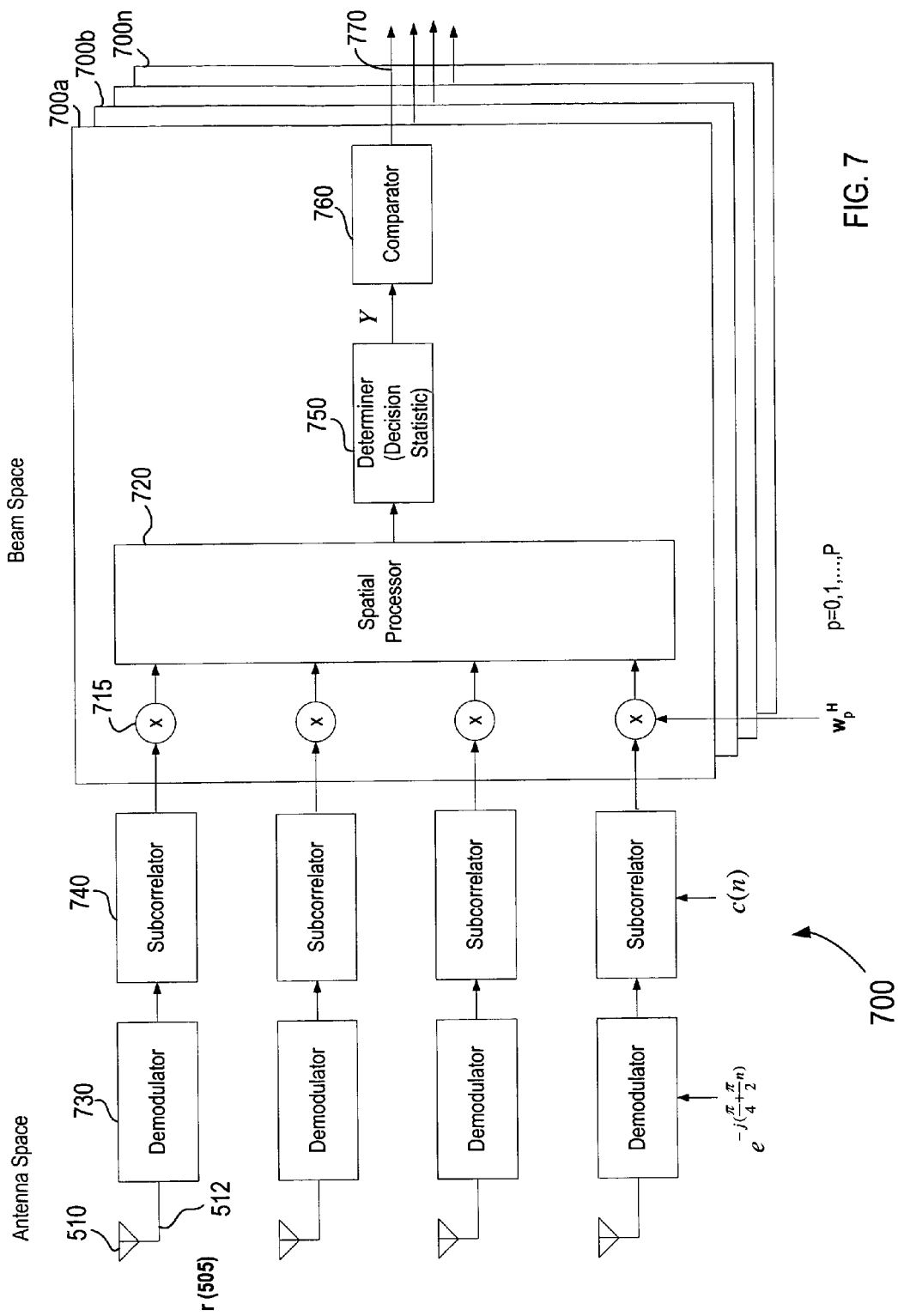
FIG. 7 is a block diagram of an arrangement for preamble detection with direct implementation of a spatial processing block, in accordance with another exemplary embodiment of the present invention.

FIG. 7 is a block diagram of an arrangement for preamble detection with direct implementation of a spatial processing block, in accordance with another exemplary embodiment of the present invention. Since the temporal processing and the spatial processing are linear operations, they can be performed in any order; hence, FIG. 7 is an equivalent structure to FIG. 5, but is based on performing spatial processing after temporal correlation is derived. In other words, in arrangement 700, spatial processing is performed after a received uplink signal is demodulated by demodulator blocks 730 and subject to temporal processing by subcorrelator blocks 740 in FIG. 7 to provide a subcorrelation signal outputs for weighting at multiplexers 715 and spatial processing at spatial processing blocks 720. Since the rate of the subcorrelation signal is reduced from the chip-rate signal by the coherent accumulation length (the number of chips in a subcorrelation block), the complexity of this 'subcorrelation signal option' is lower than the chip-rate spatial processing option. From spatial processing at spatial processor block 720, the decision statistic calculation and threshold comparison to determine whether a RACH preamble is identical to FIGS. 5 and 6.

Figure 8:
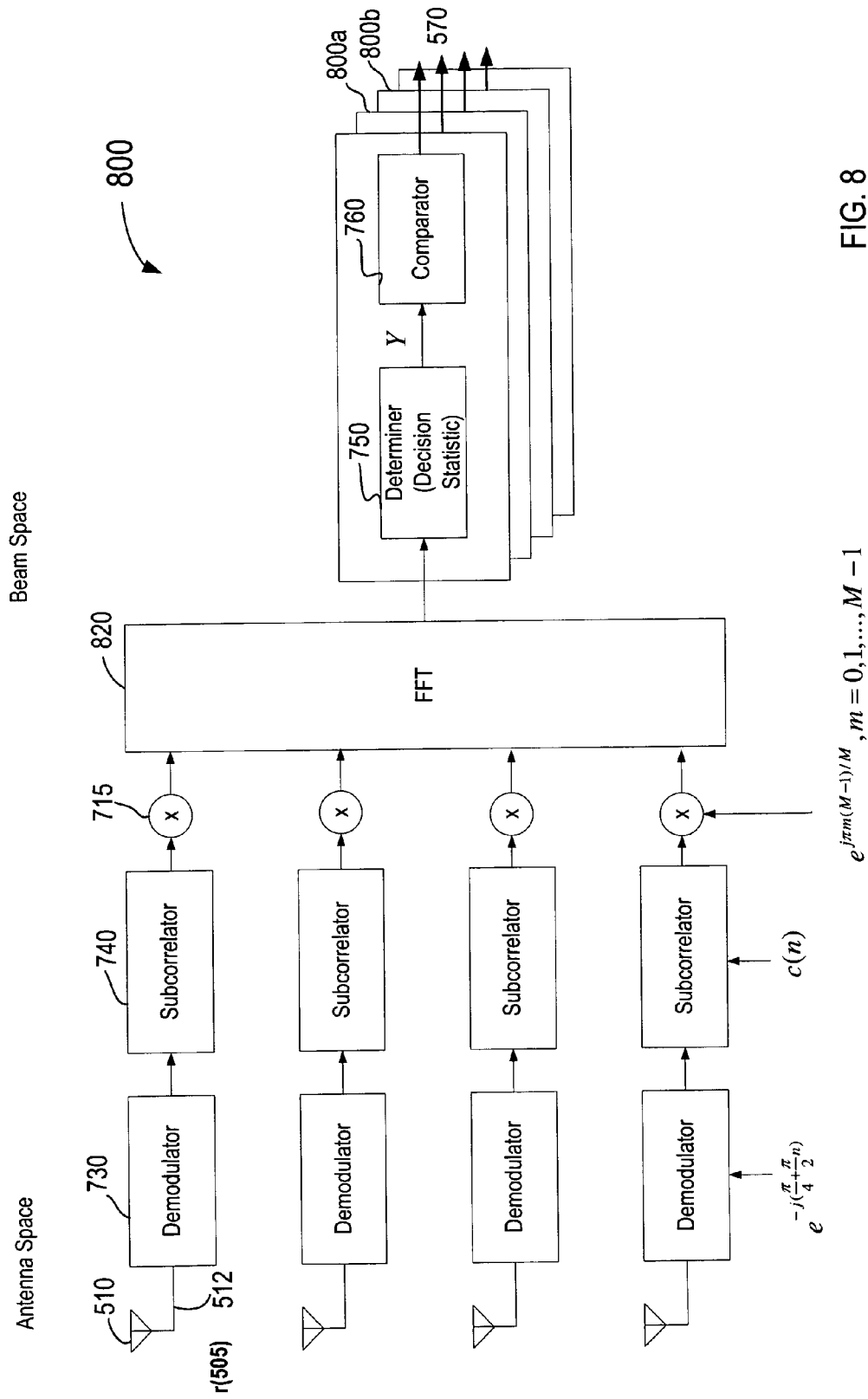
FIG. 8 is a block diagram of an arrangement for preamble detection with a FFT implementation of a spatial processing block, in accordance with another exemplary embodiment of the present invention.

FIG. 8 is a block diagram of an arrangement for preamble detection with a FFT implementation of a spatial processing block, in accordance with another exemplary embodiment of the present invention. Arrangement 800 in FIG. 8 is similar to FIG. 7 in structure, but uses an FFT block 820 instead of direct implementation. The weighting at multiplexers 815 for spatial processing by FFT is similar to what is shown in FIG. 6.

Figure 9:
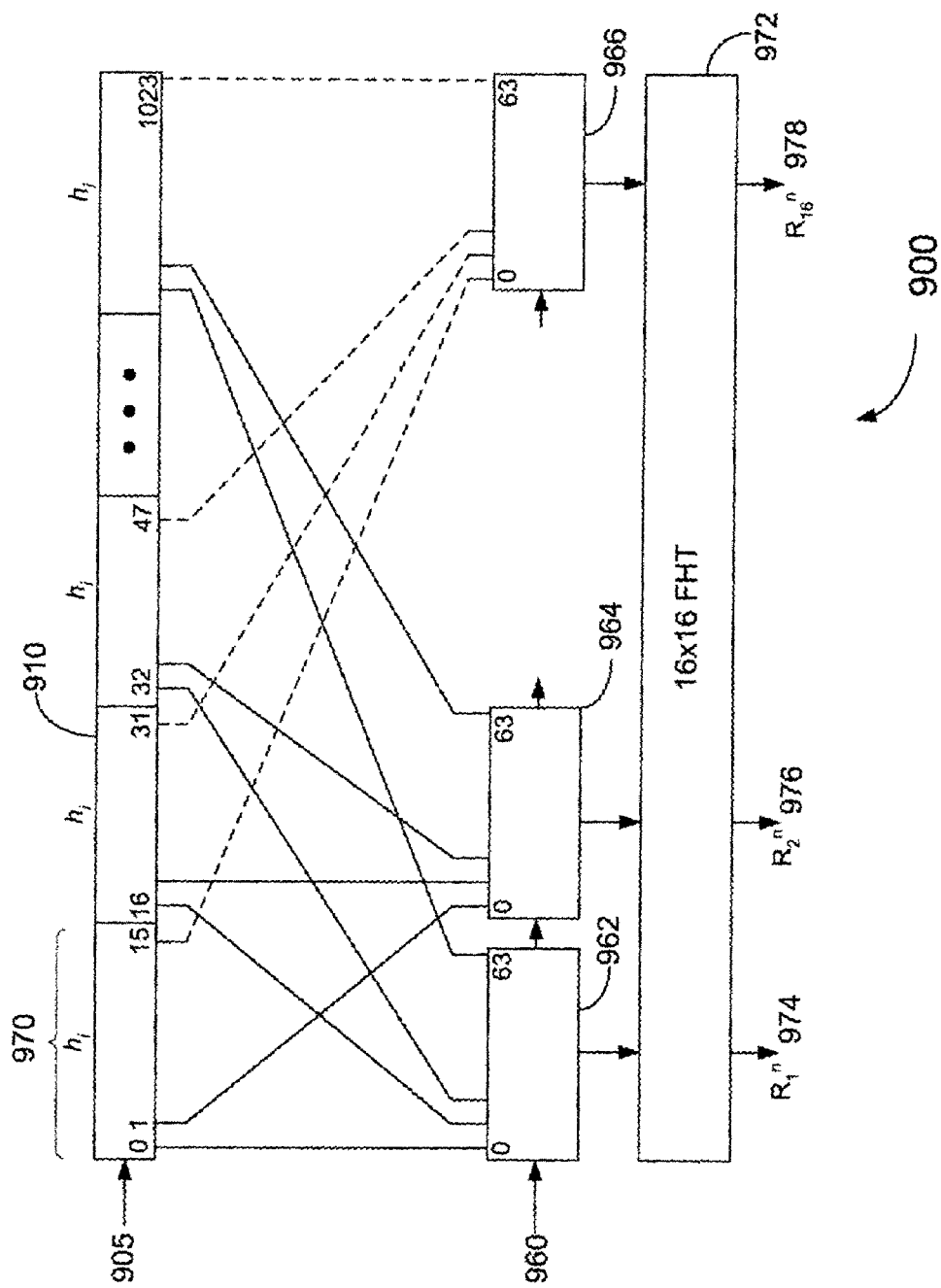
FIG. 9 is a block diagram of an exemplary subcorrelator utilized in accordance with an exemplary embodiment of the present invention.

FIG. 9 is a block diagram of an exemplary subcorrelator segment utilized in accordance with an exemplary embodiments of the present invention. Particularly, FIG. 9 illustrates exemplary structure and operation of a single subcorrelator segment 900 of the subcorrelators shown in FIGS. 5-8. The subcorrelator segment 900 could be configured as described in FIG. 4 of co-pending and commonly assigned U.S. patent application Ser. No. 09/773,176 to Lee et al., entitled "Segmented Architecture for Multiple Sequence Detection and Identification with Frequency Offset Compensation", the relevant portions of which are incorporated by reference herein.

Referring to FIG. 9, shift register 910 receives 1024 (or should it be 256?) samples (K/L) of the received incoming signal sequence 905, which may be represented as a 16-symbol segment sequence (L=16) segmented in subcorrelator segment 900 from a collection of K input samples of the received uplink signal. The received incoming signal sequence in shift register 910 is de-interleaved and provided to correlators 962, 964 through 966. The de-interleaving is used to reverse any interleaving that was performed when the sequence was produced by the UE. The de-interleaving may be skipped if the transmitted sequence was produced without interleaving. It should be noted that only three correlators are shown, but in this embodiment 16 correlators of length 16 are used. Sixteen correlators are used in this example because it is assumed that the preamble signature sequence contains S=16 symbols. Generally, the number of correlators should match the number of symbols (S) in the sequence to be identified, and the correlators should have a length of C/L, where C is the number of chip periods per symbol period in the signature sequence, and L=16. In this example, C=1024.

Returning to the 16 symbol example, the first period chip value of each 16 chip long repeating period 970 is provided to correlator 962; the second chip period value of each 16 chip long repeating period 970 is provided to correlator 964; and in a similar fashion the remaining correlators are populated with input values until correlator 966 receives the last chip value of each 16 chip long repeating period 70. The coefficients 960 or representative symbols provided to correlators 962, 964 and 966 are a (16) chip C/L value sequence that is expected when taking into account the chip period by chip period multiplication between the interleaved sequence and the base station associated binary sequence. Each correlator output indicates how well the C/L chip values provided to the correlator correspond to the sequence of chip period values that are expected for a +1 or −1 symbol.

The symbol correlation outputs of correlators 962, 964, and 966 are provided to a 16×16 (16 symbols by 16 preamble signature sequences) FHT 972. Based on the outputs from the correlators, FHT 972 provides a subcorrelated signal on each of its 16 signal identity outputs indicating how well the signal represented by the symbol correlation inputs from the correlators correspond to each of n (n=0 . . . 16) possible preamble signature sequences. For example, output 974 indicates how well the sequence in register 910 corresponds to a first signature sequence (n=0). Similarly, output 976 indicates how well the sequence in register 910 corresponds to a second signature sequence (n=1). Finally, output 978 indicates how well the sequence in register 910 corresponds to a sixteenth signature sequence (n=16). It should be noted that if n possible preamble signature sequences are to be identified, an n output FHT should be used. Additionally, it is desirable for the number of symbols (16) to equal n. The sucbcorrelated signals are then output from each subcorrelator segment of each subcorrelator block for the determination of the decision statistic, as described above and illustrated in FIGS. 5-8.

It should be noted that the block diagrams illustrated in FIGS. 3 through 9 may be carried using individual circuits associated with each block, applications specific integrated circuit (ASIC) or a general purpose processor such as a digital signal processor (DSP) that performs the functions illustrated by the functional block diagram.

Figure 10:
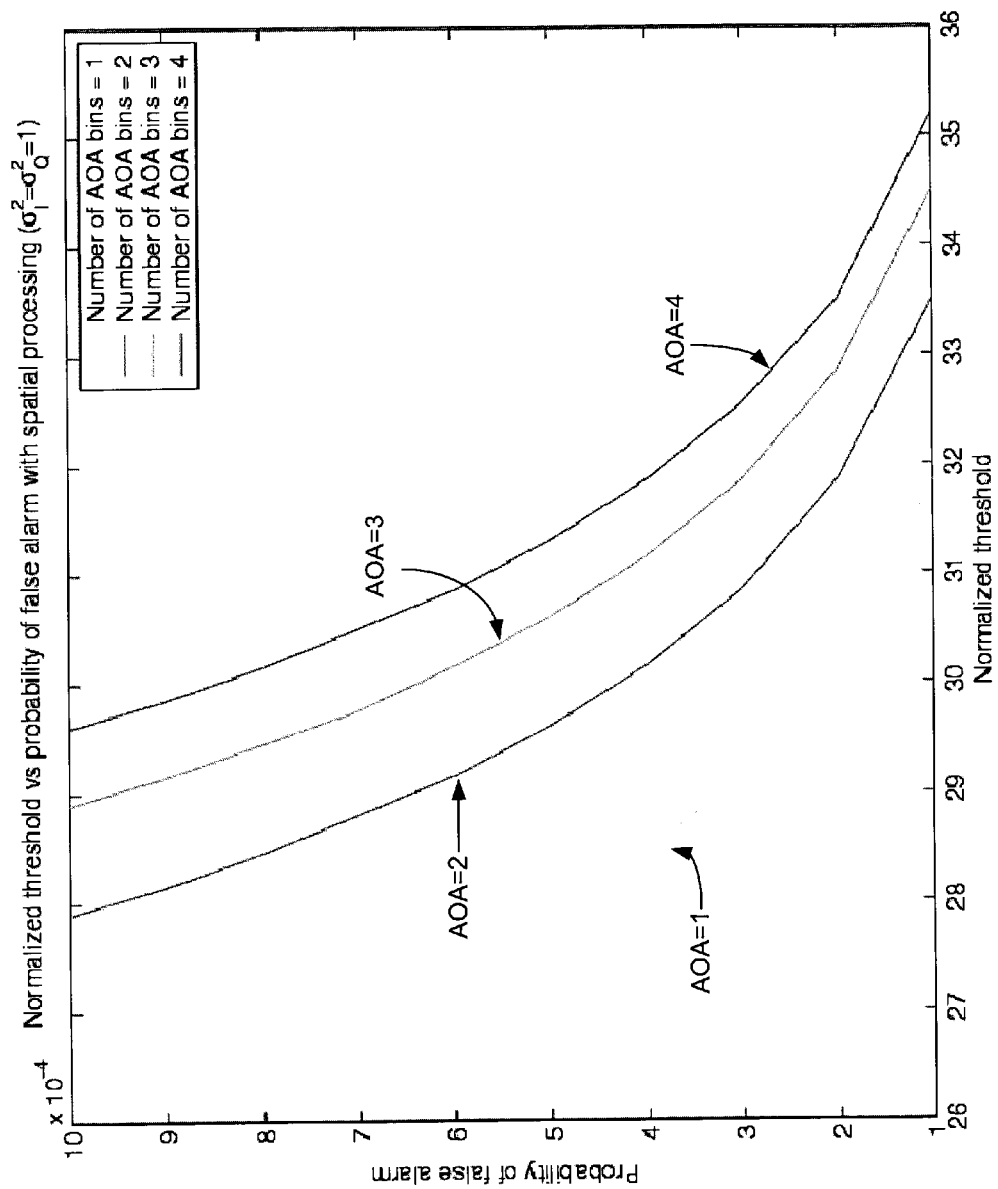
FIG. 10 is a graph illustrating a probability of false alarm for normalized threshold values in accordance with the exemplary embodiments of the present invention.

FIG. 10 is a graph illustrating a probability of false alarm for normalized threshold values in accordance with exemplary embodiments of the present invention. The normalized threshold value is set for $\sigma_1^2 = \sigma_Q^2 = 1$. As the number of angle bins increases, the threshold is set to a higher value so that $P_{FA}$ over all angle bins is maintained at a certain desired value. There may be penalty in terms of probability of detection ($P_D$) when the number of angle bins increases; thus the number of angle bins may be limited as much as practicable to reduce or minimize penalty in preamble detection performance. Accordingly, FIG. 10 shows the effects of varying the threshold on false alarm probability for the ULA-4V antenna configuration, with 1, 2, 3 and 4 closely spaced antennas. FIG. 10 illustrates that a threshold value should be chosen depending on antenna configuration and false alarm probability requirements.

Figure 11A:
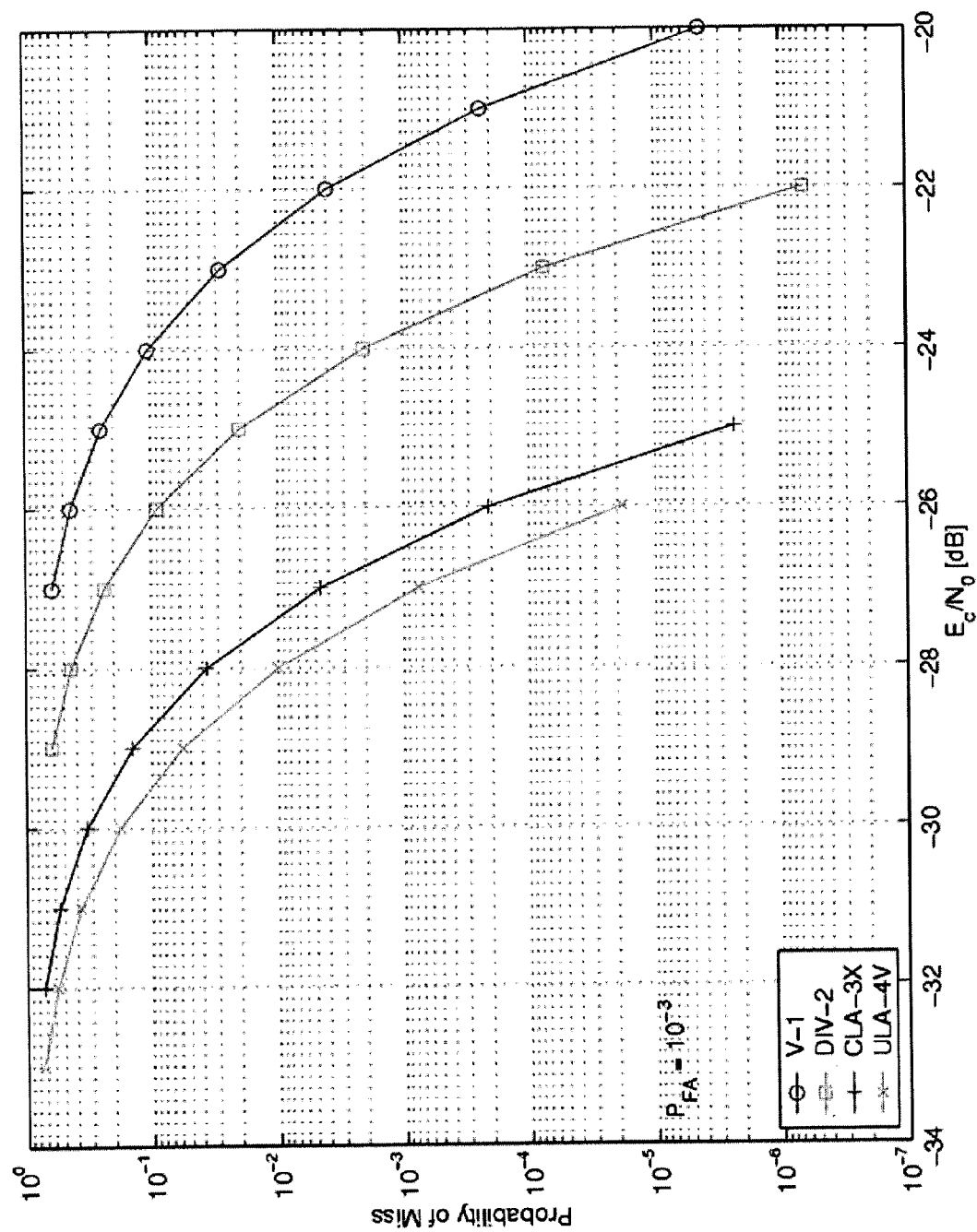
FIGS. 11A and 11B are graphs illustrating the probability of miss for various antenna configurations in accordance with the exemplary embodiments of the invention.
Figure 11B:
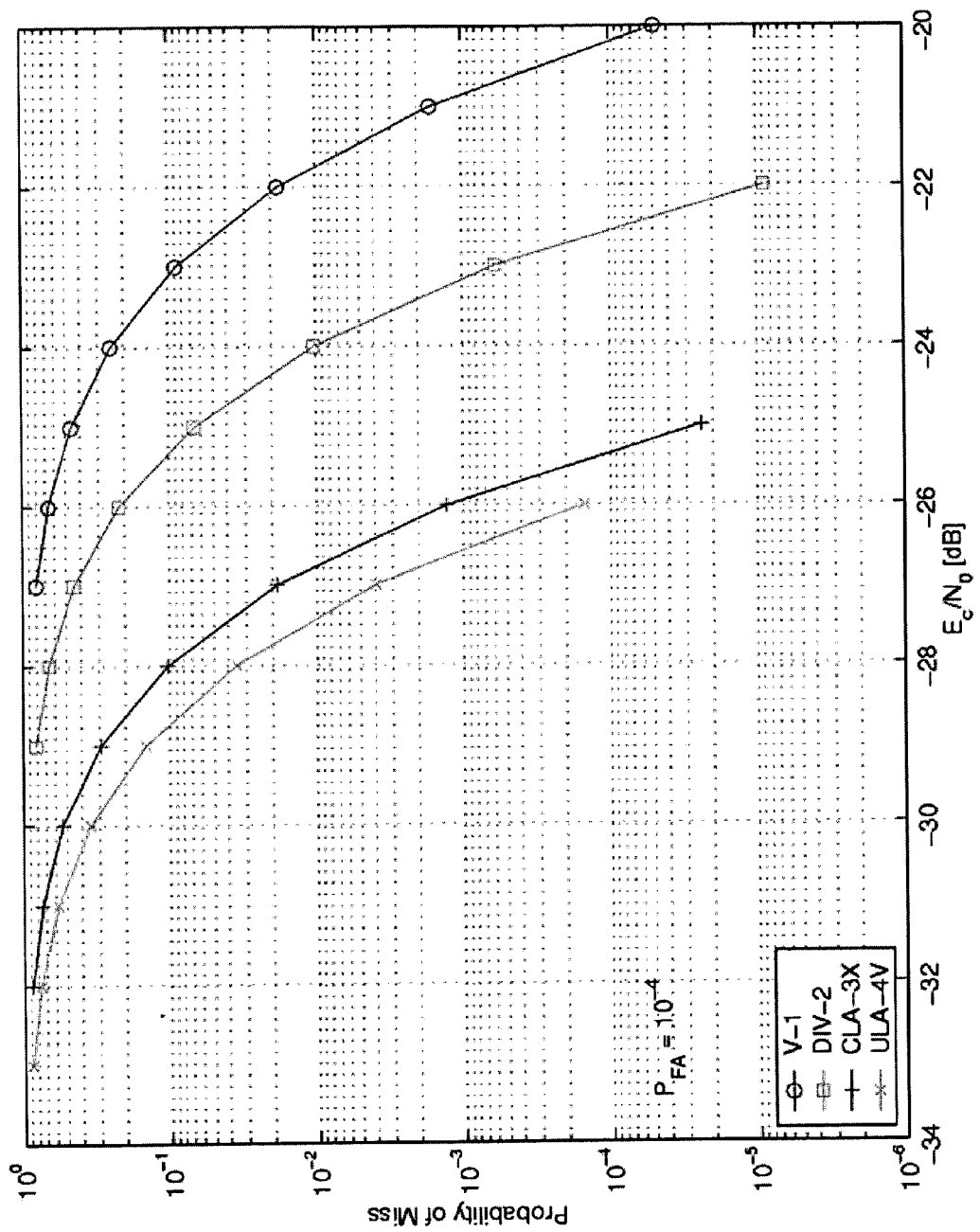
Figure 12A:
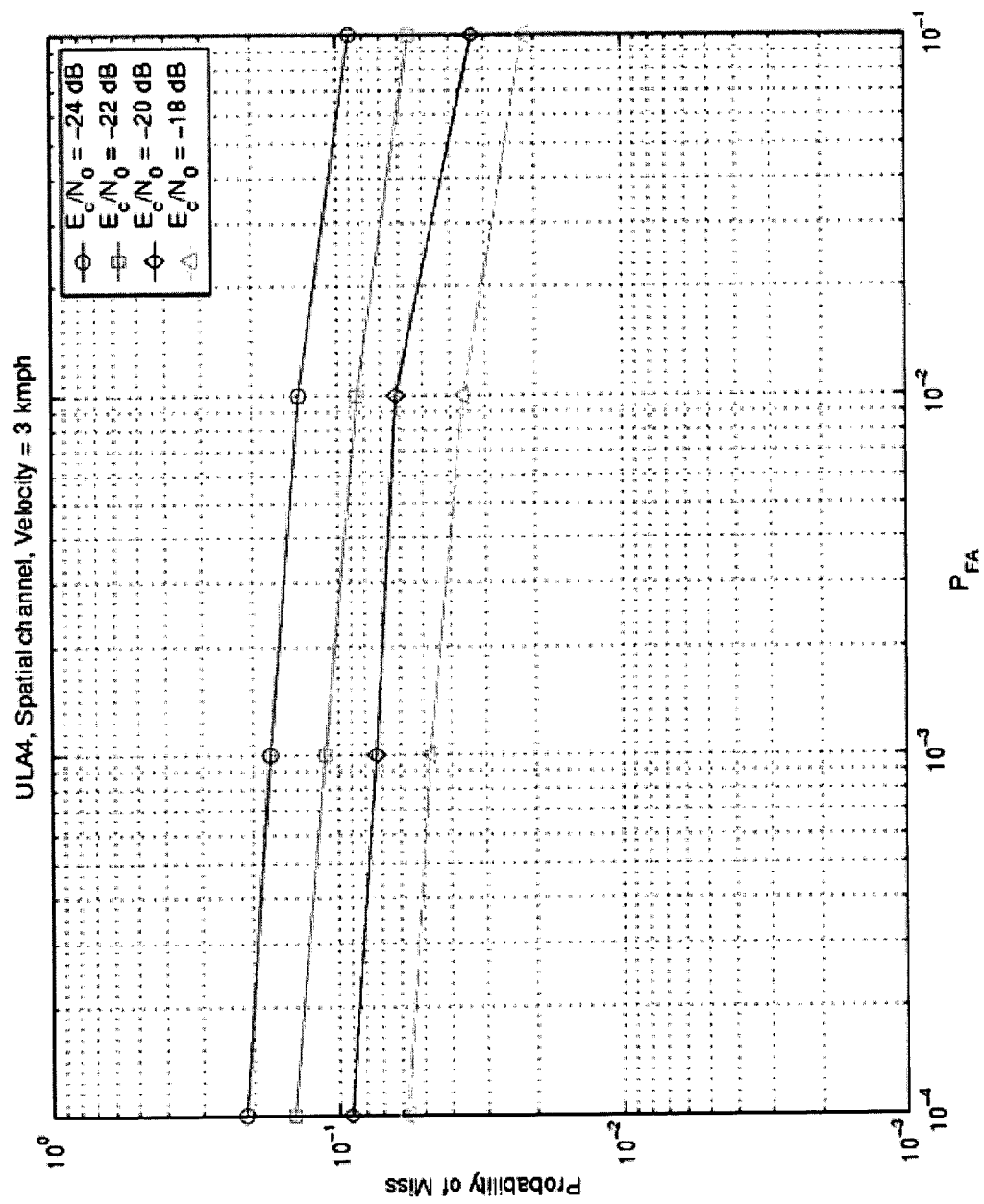
FIGS. 12A to 13B illustrate Receiver Operating Characteristic (ROC) performance of ULA-4V and CLA-3X in flat fading channel.
Figure 12B:
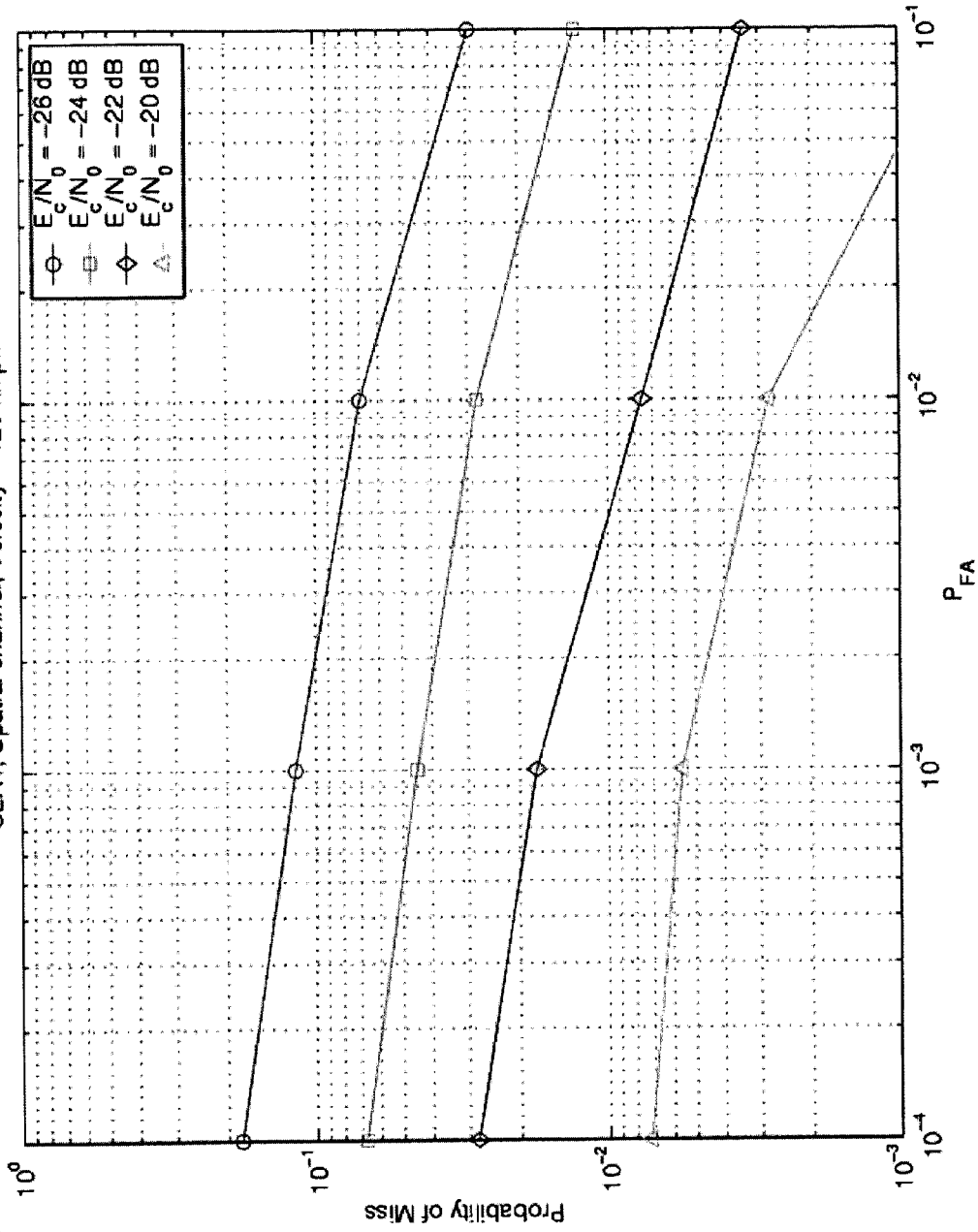
Figure 13A:
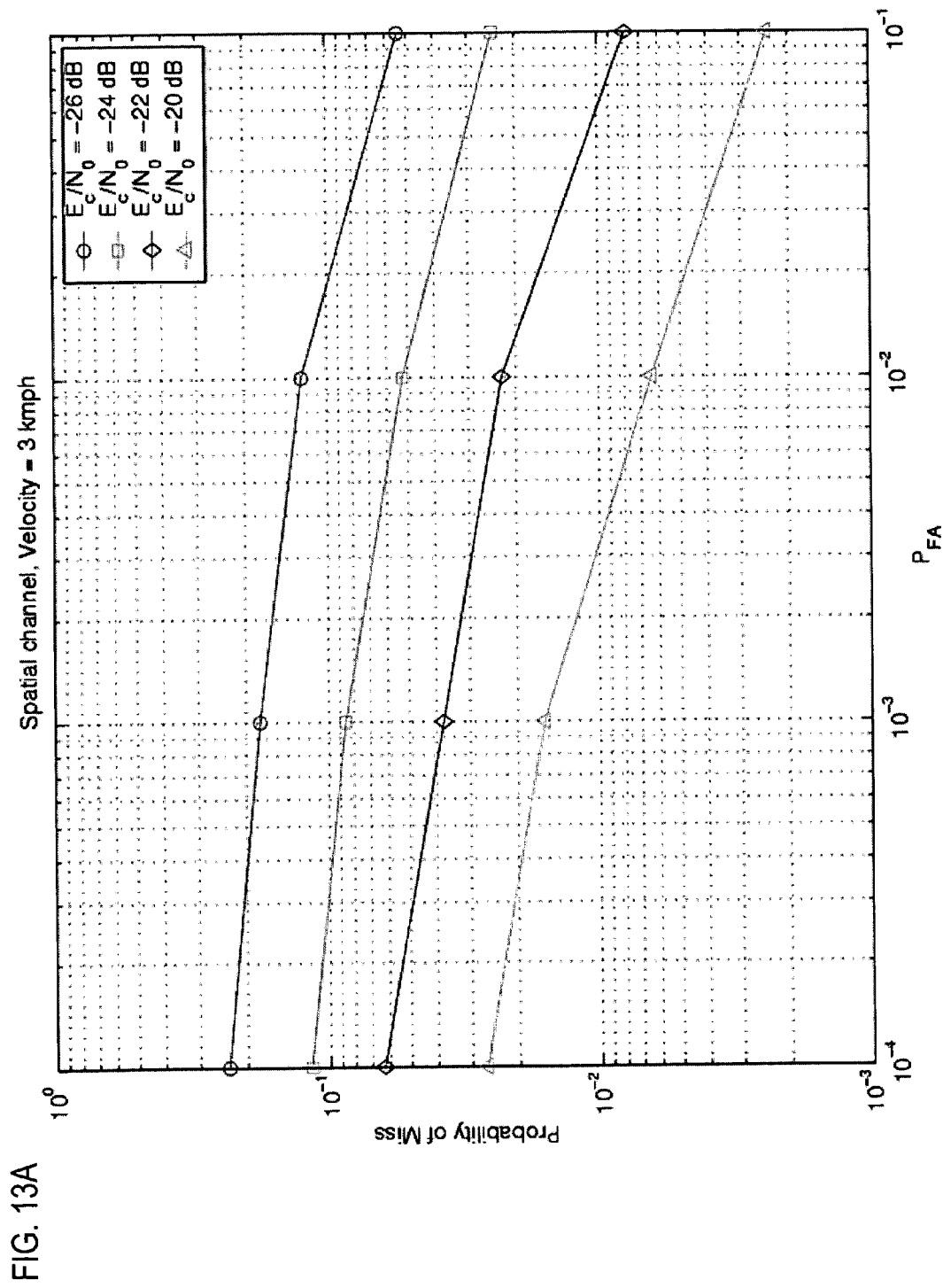
Figure 13B:
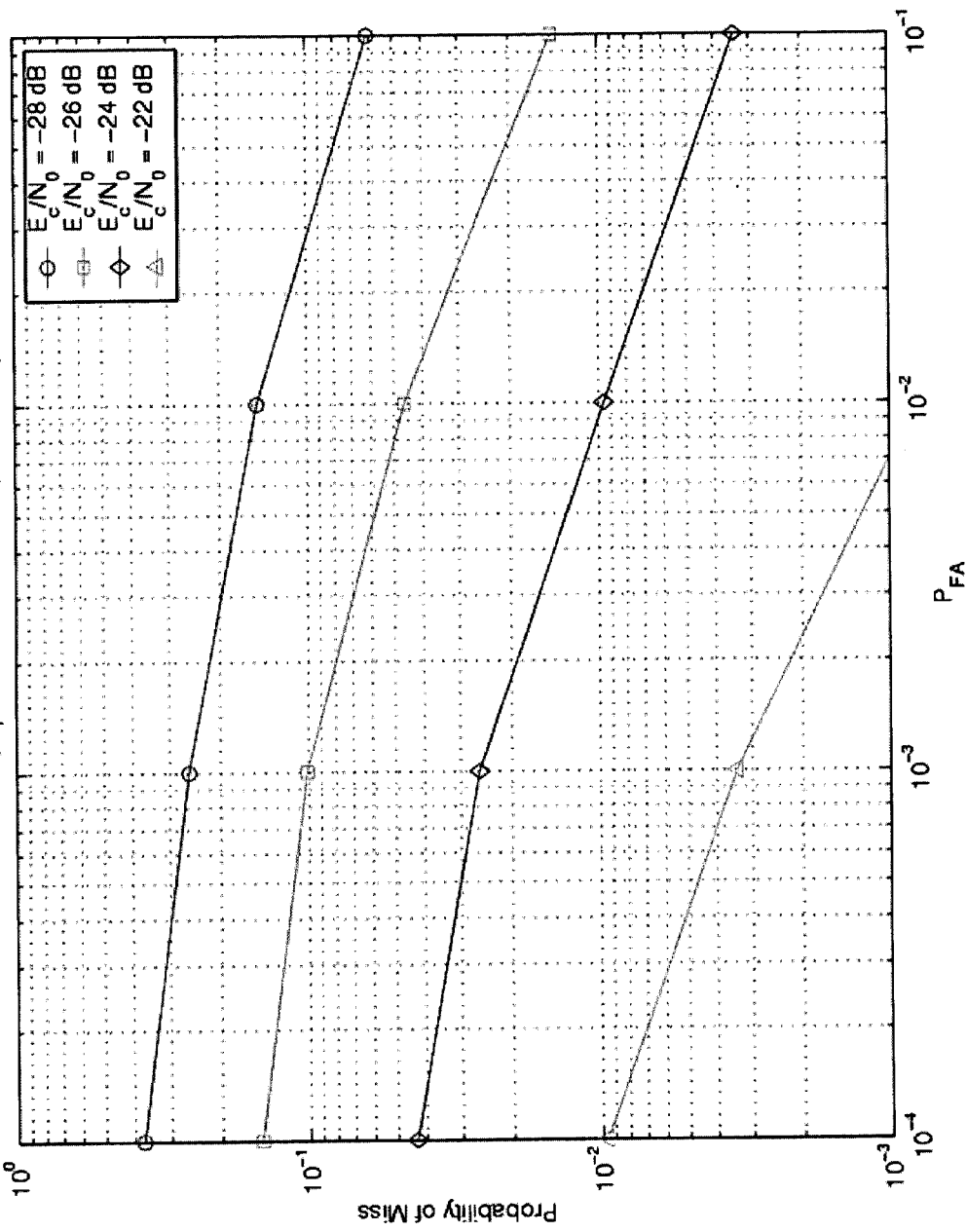

FIGS. 11A and 11B are graphs illustrating the probability of miss for various antenna configurations in accordance with the exemplary embodiments of the invention. Particularly, probability of miss ($P_M$) is shown antenna configurations V-1, DIV-2, CLA-3X, and ULA-4V. In FIG. 11A, $P_M$ is shown for $P_{FA}=0.001$ and in FIG. 11B for $P_{FA}=0.0001$, each at various signal to noise ratios ($E_c/N_0$). For FIGS. 11A and 11B, J=4 (J is the number of sub-correlation blocks) and $N_C=1024$ ($N_C$ is the coherent accumulation length in number of bits for control bit block i) Also, the $E_c/N_0$ required to achieve a desire $P_M$ for $P_{FA}=0.001$ was determined. For V-1, $P_M=0.1, 0.01, 0.001$ and $0.0001$ are obtained at $E_c/N_0=-24$, −22.5, −21.5, and −20.75 dB. For CLA-3X and ULA-4V, the same $P_M$ are obtained, at $E_C/N_0$=−29, −27.5, −26.5 and −25.8 dB, and $E_C/N_0$=−29.5, −28, −27 and −26.25 dB, respectively. Four antenna spatial processing improves the detection performance by approximately 5.0 dB for CLA-3X and 5.5 dB for ULA-4V. If there is no penalty for using multiple angle bins, the gain for ULA-4V would be 6 dB. The penalty incurred by using multiple angle bins is accountable for the 0.5 dB difference.

EXAMPLES AND RESULTS

A spatial channel model was utilized to verify preamble detection performance in the presence of angle spread. The parameters of the spatial channel model are shown in Table 1.

TABLE 1

Parameters of spatial channel model

| Parameter | Value |
| --- | --- |
| Distribution of Scatters | bi-variate Gaussian |
| Angle of Arrival | 14.48° |
| Steering angle | 14.48° |
| Angle spread $\theta_\phi$ | 2.50 |
| Number of scatters | 30 |
| Mobile velocity | 3 kmph, 120 kmph |
| Distance from mobile to base station | 300 m |
| Antenna configuration | V-1, DIV-2, ULA-4V, CLA-3X |

FIGS. 12A to 13B illustrate Receiver Operating Characteristic (ROC) performance of ULA-4V and CLA-3X in a flat fading channel. For this example, mobile velocities were v=3 kmph, see FIGS. 12A (ULA-4V) and 13A (CLA-3X); v=120 kmph, see FIGS. 12B (ULA-4V) and 13B (CLA-3X). In both cases, J=4, $N_c$=1024 and angle spread, $\sigma_{100}$, was assumed equal to 2.5°. Comparison of results for ULA-4V and CLA-3X shows that CLA-3X outperforms ULA-4V, especially for slow mobiles (v=3 kmph).

Figure 14A:
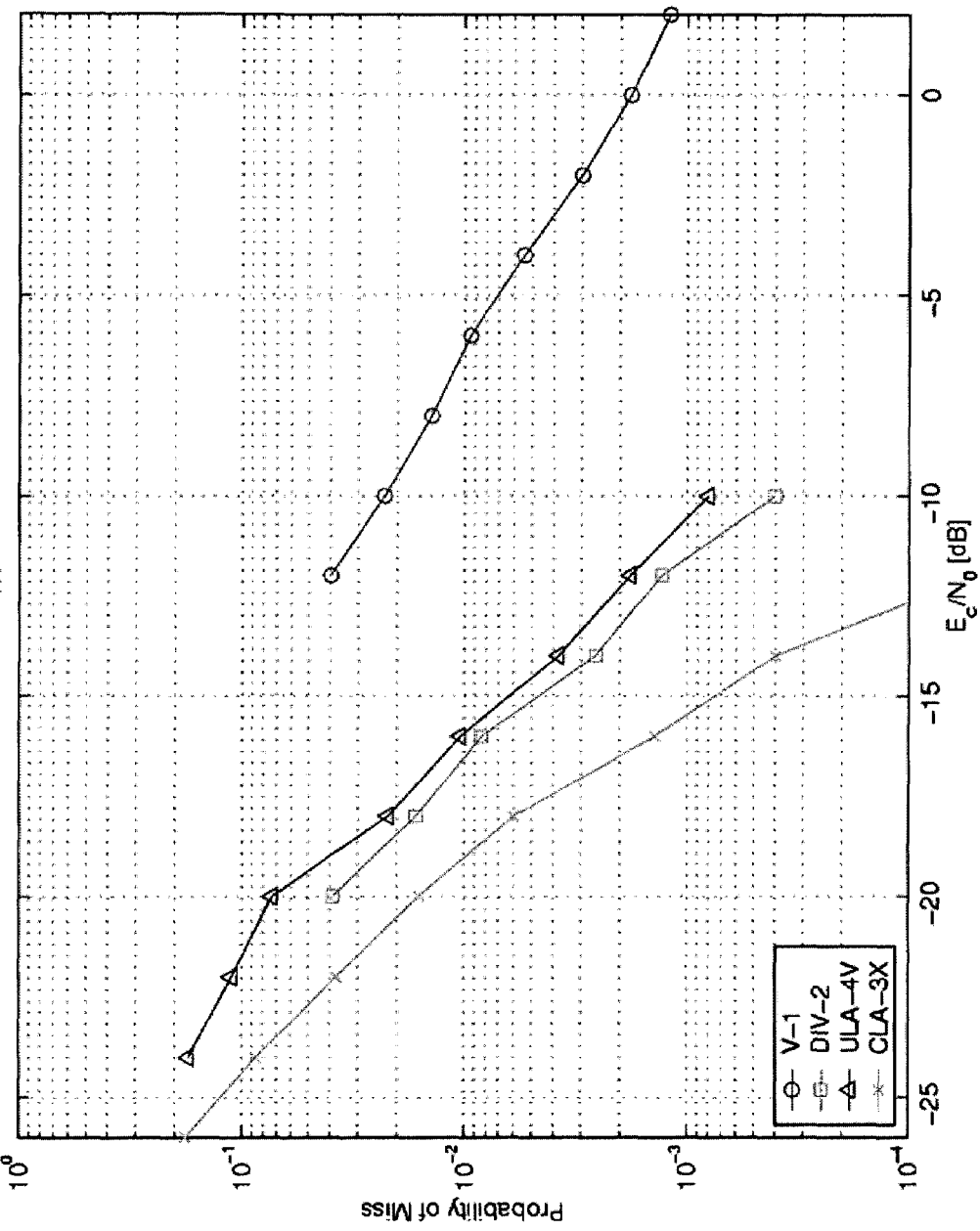
FIGS. 14A and 14B are graphs showing a comparison of probability of miss for various antenna configurations
Figure 14B:
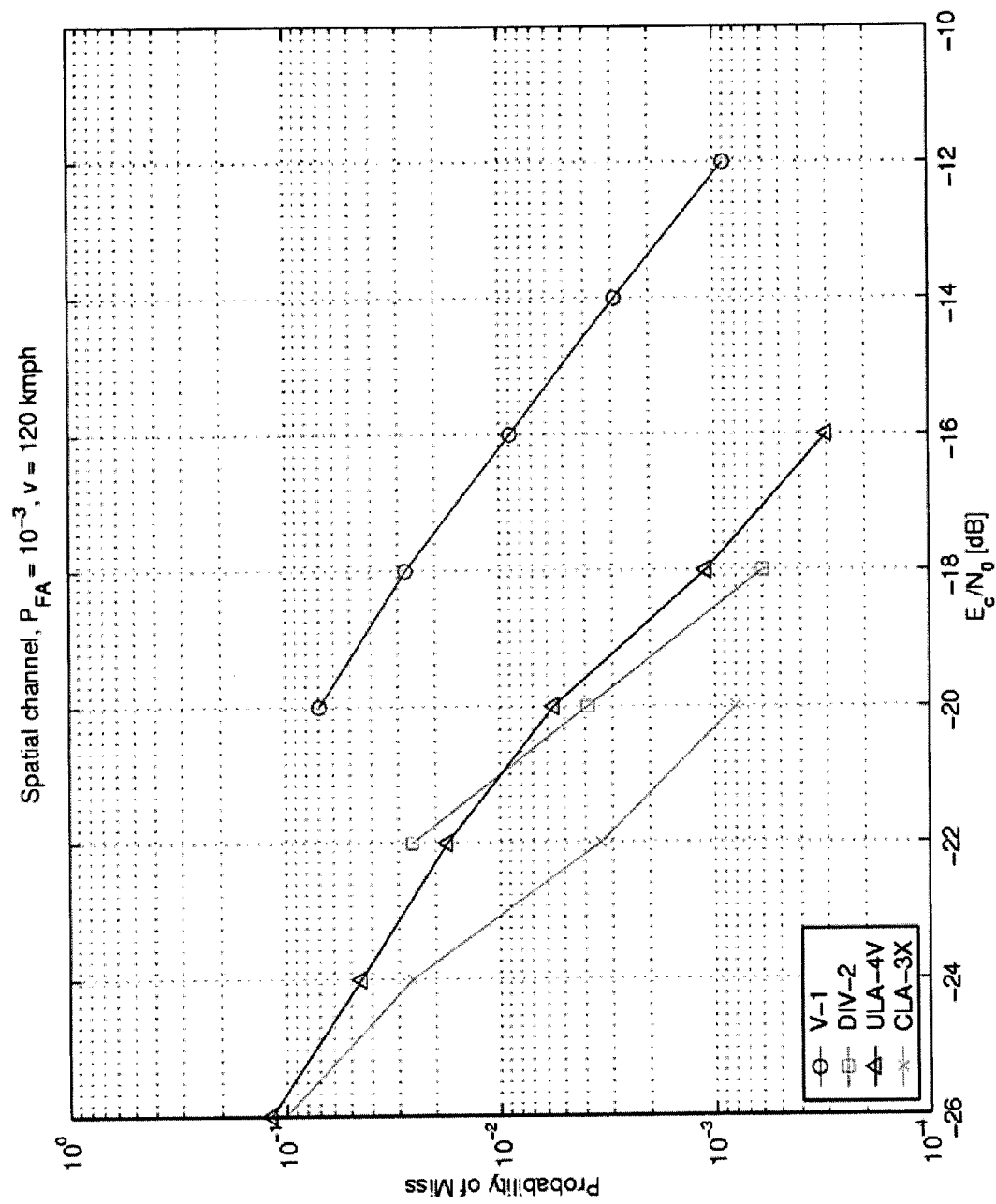

FIGS. 14A and 14B are graphs showing a comparison of probability of miss for various antenna configurations. FIG. 14A is a graph of mobile velocities evaluated at v=3 kmph, and at v=120 kmph in FIG. 14B. In both cases, J=4, $N_c$=1024 and angle spread $\sigma_{100}$=2.5°. For a slow mobile with v=3 kmph, DIV-2 outperformed V-1 and ULA-4V by approximately 13 dB and 1 dB at $P_M$=10$^{-3}$; CLA-3X outperformed ULA-4V and DIV-2 by 5 dB and 4 dB, respectively, at the same $P_M$. For v=120 kmph, DIV-2 performed better than V-1 by 6.5 dB, and CLA-3X outperformed ULA-4V by 2.5 dB. These results show that diversity reception may be critical in preamble detection performance, especially for mobiles with low velocity. As the velocity increases, performance difference between CLA-3X and ULA-4V decreases.

The exemplary embodiments of the invention being thus described, it will be obvious that the same may be varied in many ways. Such variations are not to be regarded as departure from the spirit and scope of the exemplary embodiments of the invention, and all such modifications as would be obvious to one skilled in the art are intended to be included within the scope of the following claims.

What is claimed is:

1. A method of detecting a random access channel preamble in a received uplink signal from a user, comprising:

spatially processing and temporally processing an uplink signal received at one or more receive antennas of a base station receiver and containing data related to a random access channel preamble to detect the random access channel preamble, wherein temporal processing includes:

temporally correlating the received uplink signal to output at least one subcorrelation output signal, determining, for each subcorrelation output signal, a decision statistic as the magnitude squared of the subcorrelation output signal, and comparing a maximum of the determined decision statistics to a threshold value, the random access channel preamble of the uplink signal having been detected if the maximum decision statistic meets or exceeds the threshold value, and determining the threshold value so that as the number of antenna beams for a given angle of arrival of the received uplink signal increase, the threshold value increases so as to maintain a probability of false alarm over all antenna beams to a desired value, wherein the probability of false alarm is a probability that the uplink signal is falsely detected when no random access channel preamble has been transmitted by the user.

2. The method of claim 1, wherein the received uplink signal is subject to spatial processing prior to temporally processing the spatially processed signal.

3. The method of claim 1, wherein the received uplink signal is subject to temporal correlation prior to spatial processing of the subcorrelation output signal.

4. The method of claim 1, wherein the received uplink signal further includes a cell-specific scrambling code used in determining the spatially processed signal.

5. The method of claim 1, wherein the received uplink signal further includes a time delay of the specified path for the user and a complex Gaussian noise component.

6. The method of claim 1, wherein spatial processing further includes multiplying the received uplink signal by a weight vector to determine the spatially processed signal.

7. The method of claim 6, wherein the weight vector is a function of a direction of the angle of arrival of the uplink signal and the number of receive antennas receiving the uplink signal.

8. The method of claim 1, wherein the one or more received antennas are configured as one of a single antenna, a pair a widely spaced antennas, a clustered linear array and a uniform linear array.

9. The method of claim 1, wherein spatial processing includes determining a spatially processed signal as a function of an amplitude of the uplink signal transmitted from the user, a user-specific preamble signature sequence of the user, the total number of antennas at the base station receiver, and a channel coefficient of a specified path for a given receive antenna of the receiver, the channel coefficient representing a beam formed by the given receive antenna in a given direction.

10. A method of determining a best cell portion for communicating with a user, the best cell portion being a portion of a cell where a received uplink signal from the user has a highest signal to interference ratio, comprising:

subjecting an uplink signal from a user that is received at one or more receive antennas and containing data related to a random access channel preamble to spatial processing and temporal processing to detect a random access channel preamble, the detected random access channel preamble indicative of the best cell portion for communicating with the user, wherein temporal processing includes:

temporally correlating the received uplink signal to output at least one subcorrelation output signal, determining, for each subcorrelation output signal, a decision statistic as the magnitude squared of the subcorrelation output signal, and comparing a maximum of the determined decision statistics to a threshold value, the random access channel preamble of the uplink signal having been detected if the maximum decision statistic meets or exceeds the threshold value.

11. The method of claim 10, wherein spatial processing includes determining a spatially processed signal as a function of an amplitude of the uplink signal transmitted from the user, a user-specific preamble signature sequence of the user, the total number of antennas at the base station receiver, and a channel coefficient of a specified path for a given receive antenna of the receiver, the channel coefficient representing a beam formed by the given receive antenna in a given direction.

12. A method of detecting a random access channel preamble of a received uplink signal from a user in a communication system, comprising:

spatially processing an uplink signal received at one or more receive antennas of a base station receiver and containing data related to a random access channel preamble to output a spatially processed signal;

wherein spatial processing includes determining a spatially processed signal as a function of an amplitude of the uplink signal transmitted from the user, a user-specific preamble signature sequence, the total number of antennas at the base station receiver, and a channel coefficient of a specified path for a given receive antenna of the receiver, the channel coefficient representing a beam formed by the given receive antenna in a given direction, and temporally processing the spatially processed signal to detect the random access channel preamble component.

13. The method of claim 12, wherein spatial processing further includes multiplying the received uplink signal by a weight vector that is a function of a direction of the angle of arrival of the uplink signal and the total number of receive antennas at the base station receiving the uplink signal.

14. The method of claim 13, wherein temporally processing of the spatially processed signal includes:

subjecting the spatially processed signal to temporal correlation to output at least one subcorrelation output signal that includes data related to one or more random access channel preamble signatures of a user, a channel coefficient representing a beam formed by the given receive antenna in a given direction toward the user, and transmitted chip energy of the preamble signatures;

determining, for each subcorrelation output signal, a decision statistic as a magnitude squared of the subcorrelation output signal;

comparing a maximum of the calculated decision statistics to a threshold value; and detecting a random access channel preamble if the maximum decision statistic equals or exceeds the threshold value.

15. The method of claim 12, wherein spatial processing of the received uplink signal is performed using a direct implementation of spatial processing, using multiplication by weight vector and accumulation.

16. The method of claim 12, wherein spatial processing of the received uplink signal is performed using a Fast Fourier Transform (FFT) implementation.

17. A method of detecting a random access channel preamble in a received uplink signal from a user in a communication system, comprising:

subjecting an uplink signal received at one or more receive antennas and containing data related to a random access channel preamble to temporal correlation to output a subcorrelated signal based at least on angle of arrival of the uplink signal; and spatially processing the subcorrelated signal to output a spatially processed signal, wherein spatial processing includes determining the spatially processed signal as a function of an amplitude of the uplink signal transmitted from the user, a user-specific preamble signature sequence of the user, the total number of antennas at the base station receiver, and a channel coefficient of a specified path for a given receive antenna of the receiver, the channel coefficient representing a beam formed by the given receive antenna in a given direction;

determining a decision statistic from the spatially processed signal;

comparing the decision statistic to a threshold value; and detecting a random access channel preamble if the decision statistic equals or exceeds the threshold value.

18. The method of claim 17, wherein spatial processing includes multiplying the received uplink signal by a weight vector that is a function of a direction of the angle of arrival of the uplink signal and the number of receive antennas receiving the uplink signal.

19. The method of claim 17, wherein spatial processing of the received uplink signal is performed using a direct implementation of spatial processing, using multiplication by weight vector and accumulation.

20. The method of claim 17, wherein spatial processing of the received uplink signal is performed using a Fast Fourier Transform (FFT) implementation.

* * * * *